(12) United States Patent
Smith

(10) Patent No.: US 12,540,529 B2
(45) Date of Patent: Feb. 3, 2026

(54) SUBSURFACE CARBON DIOXIDE ANALYSIS METHODS

(71) Applicant: Michael Smith, Tulsa, OK (US)

(72) Inventor: Michael Smith, Tulsa, OK (US)

(*) Notice: Subject to any disclaimer, the term of this patent is extended or adjusted under 35 U.S.C. 154(b) by 704 days.

(21) Appl. No.: 17/947,145

(22) Filed: Sep. 18, 2022

(65) Prior Publication Data
US 2023/0081834 A1 Mar. 16, 2023

Related U.S. Application Data

(63) Continuation-in-part of application No. PCT/US2021/023255, filed on Mar. 19, 2021.
(Continued)

(51) Int. Cl.
*E21B 41/00* (2006.01)
*B01D 53/62* (2006.01)
(Continued)

(52) U.S. Cl.
CPC .......... *E21B 41/0064* (2013.01); *B01D 53/62* (2013.01); *C01B 32/50* (2017.08); *E21B 49/02* (2013.01)

(58) Field of Classification Search
CPC .... E21B 41/0064; E21B 49/02; E21B 49/005; B01D 53/62; C01B 32/50; Y02C 20/40; G01V 9/007; G01N 33/24
See application file for complete search history.

(56) References Cited

U.S. PATENT DOCUMENTS 4,495,414 A 1/1985 Barrie
4,525,328 A 6/1985 Bredeweg
(Continued)

FOREIGN PATENT DOCUMENTS

BR 1120190119442 4/2023
CA 2068012 12/1992
(Continued)

OTHER PUBLICATIONS

Sam Holloway Carbon Dioxide Capture and Geological Storage Philosophical Transactions: Mathematical, Physical and Engineering Sciences, Apr. 15, 2007, vol. 365, No. 1853, Energy for the Future (Apr. 15, 2007), pp. 1095-1107 (Year: 2007).*
(Continued)

*Primary Examiner* — Daniel Berns
*Assistant Examiner* — Joshua Maxwell Speer
(74) *Attorney, Agent, or Firm* — Transformative Legal LLC; Len S. Smith; Denise M Brown

(57) ABSTRACT

Provided herein are new methods for assessing carbon dioxide rock volatile contents of subterranean sites to identify changes in the carbon dioxide content of sites, such an assessment then applied to the evaluation of such sites for possible use as carbon capture and sequestration (CCS) sites, carbon capture, utilization, and sequestration (CCUS) sites, and for other applications. Further provided herein are methods for identifying geological features which may compromise a site's ability to serve as a CCS/CCUS site, whereby the methods comprise the application of rock volatiles analysis, mechanical strength analysis, or both, and the subsequent identification of such geological features based on shifts, changes, or patterns in data resulting from the analysis. Additional related methods and systems are also disclosed.

18 Claims, 12 Drawing Sheets

Related U.S. Application Data

(60) Provisional application No. 63/015,418, filed on Apr. 24, 2020, provisional application No. 62/992,480, filed on Mar. 20, 2020.

(51) Int. Cl.
  *C01B 32/50* (2017.01)
  *E21B 49/02* (2006.01)

(56) References Cited

U.S. PATENT DOCUMENTS

| | | | |
|---|---|---|---|
| 4,797,906 | A | 1/1989 | Smith |
| 4,960,567 | A | 10/1990 | Smith |
| 5,241,859 | A | 9/1993 | Smith |
| 5,286,651 | A | 2/1994 | Smith |
| 5,328,849 | A | 7/1994 | Smith |
| 5,341,859 | A | 8/1994 | Howseman, Jr. |
| 5,411,707 | A | 5/1995 | Hiatt |
| 5,416,024 | A | 5/1995 | Smith |
| 5,447,556 | A | 9/1995 | Pleil |
| 5,457,316 | A | 10/1995 | Cohen |
| 5,767,399 | A | 6/1998 | Smith |
| 6,511,707 | B1 | 1/2003 | MacDonald |
| 6,541,272 | B1 | 4/2003 | Mitra |
| 6,661,000 | B2 | 12/2003 | Smith |
| 6,743,397 | B1 | 6/2004 | Zesiger |
| 7,210,342 | B1 | 5/2007 | Sterner |
| 7,395,691 | B2 | 7/2008 | Sterner |
| 8,256,282 | B2 | 9/2012 | Schlachter |
| 8,536,524 | B2 | 9/2013 | Pomerantz |
| 2001/0015093 | A1 | 8/2001 | Kempe |
| 2002/0194896 | A1 | 12/2002 | Stolper |
| 2004/0099804 | A1 | 5/2004 | Liu |
| 2005/0109207 | A1 | 5/2005 | Olander |
| 2005/0197134 | A1 | 9/2005 | McGregor |
| 2010/0277724 | A1 | 11/2010 | Bounouar |
| 2011/0305309 | A1 | 12/2011 | Brown |
| 2012/0167786 | A1 | 7/2012 | Laugharn, Jr. |
| 2012/0186331 | A1 | 7/2012 | Tipler |
| 2014/0026638 | A1 | 1/2014 | Bowers, II |
| 2014/0220700 | A1 | 8/2014 | Alexander |
| 2014/0283580 | A1 | 9/2014 | Rouchon |
| 2015/0123670 | A1 | 5/2015 | Robbat, Jr |
| 2015/0155150 | A1 | 6/2015 | Bateman et al. |
| 2015/0167052 | A1 | 6/2015 | Griffin |
| 2015/0346179 | A1 | 12/2015 | Pillot |
| 2016/0222781 | A1 | 8/2016 | Lawson |
| 2018/0195383 | A1* | 7/2018 | Smith .............. H01J 49/0468 |
| 2018/0238774 | A1 | 8/2018 | Amendt |

FOREIGN PATENT DOCUMENTS

| | | |
|---|---|---|
| CN | 1609586 | 4/2005 |
| CN | 201740685 U | 2/2011 |
| CN | 104407089 | 3/2015 |
| EP | 0414564 | 2/1991 |
| EP | 0414564 B1 | 10/1995 |
| FR | 2827318 B1 | 12/2003 |
| WO | WO2003050844 | 6/2003 |
| WO | WO2015050832 | 4/2015 |
| WO | WO2016186689 | 11/2016 |
| WO | WO2019178418 | 9/2019 |
| WO | WO2020051259 | 3/2020 |
| WO | WO2021188961 A1 | 9/2021 |

OTHER PUBLICATIONS

Chibuike C. Umeaghadi; Thomas Lucock; Richard Hartley; Jessica Berry; Matthew T. Bailey, Physico-mechanical properties of halite and gypsum-mudstone crushed rock backfills of the Mercia Mudstone Group, May 14, 2024, Geoenergy (2024) 2 (1) (Year: 2024).*
Non-Final Office Action on Oct. 9, 2018 for U.S. Appl. No. 16/019,523.
Final Office Action on May 2, 2019 for U.S. Appl. No. 16/019,523.
European Examination Report on Feb. 24, 2023 for EP17880886.1.
Non-Final Office Action on Oct. 9, 2018 for U.S. Appl. No. 16/019,529.
International Search and Written Opinion for PCT/US2019/22362 dated Aug. 5, 2019.
15908760_NFOA_20180517.
Russian Office action for Application No. 2019911461 dated Aug. 19, 2020 including translation.
McCarthy, et al., "Basic Petroleum Geochemistry for Source Rock Evaluation", Oilfield Review, 23.2, 2011.
Mazidi, et al Measurement of Uniaxial Compressive Strength of Rocks Using Reconstructed Cores from Rock Cuttings, Journal of Petroleum Science and Engineering 86-87 (2012) 39-43.
Jorge, et al., "Analysis of Volatiles in Fluid Inclusions by Direction online Crushing Mass Spectrometry", Journal of Brazilian Chemical Society 22.3, 2011: 43-455, p. 445, col. 1 [online] URL<http://www.scielo.br/pdf/jbchs/v22n3/v22n3a05.ped>.
Indian Examination Report dated May 16, 2021 for Application No. 2019170221802.
International Search Report for PCT/US2017/065921 dated Apr. 6, 2018.
Search Report and Written Opinion issued on Aug. 16, 2021 for PCT Application No. PCT/US21/23255 filed Mar. 3, 2021.
Extended European Search Report on Jul. 30, 2020 for EP17880886.1.

* cited by examiner

SUBSURFACE CARBON DIOXIDE ANALYSIS METHODS

CROSS REFERENCE TO RELATED APPLICATIONS

This application is a continuation in part of PCT Application Number PCT/US21/23255, filed Mar. 19, 2001, which claims priority to U.S. Provisional Patent Application Nos. 62/992,480 and 63/015,418, filed Mar. 20, 2020, and Apr. 24, 2020, respectively, each of which being hereby incorporated herein by reference in its entirety.

BACKGROUND OF THE INVENTION

Many, if not most, scientists today agree that there is too much carbon dioxide ($CO_2$) in the 'Earth's atmosphere to maintain global temperatures at safe levels. For example, almost every model used by the Intergovernmental Panel on Climate Change (IPCC) that shows Earth reaching a stable climate involves isolating or removing 120-160 gigatons of $CO_2$ from the atmosphere by so-called "negative emissions" (Roberts. Vox. Nov. 22, 2019. Available at vox.com). There are many forms of negative emissions, but likely the only way to remove enough $CO_2$ from the environment will be to pull it directly from the air and bury (e.g., sequester) it underground in suitable repositories, e.g., saline aquifers, a process known as carbon capture and sequestration ("CCS"). Thus, carbon capture and sequestration (CCS) is a means to control $CO_2$ emissions that are captured from different processes.

To reduce $CO_2$ emissions, $CO_2$ can be stored in different geological sites, including not only deep saline formations, but also depleted oil or gas reservoirs, deep un-mineable coal seams, and shale formations, (Liu et al. (2017), Worldwide Status of CCUS Technologies and Their Development and Challenges in China, Geofluids). In comparison with the CCS technology, carbon capture, utilization, and storage ("CCUS") technology pays more attention to utilization (U) of the captured $CO_2$ while sequestration (S) plays a secondary role. Using $CO_2$ from the air for products and services is known as carbon capture and utilization ("CCU"). By some estimates, CCU may potentially represent a $1 trillion market by 2030. The Global CCS Institute, which tracks large-scale CCS projects globally, reports there are 51 CCS facilities globally in some stage of development, which expect to capture 96 million tons of $CO_2$ per year. At the time of this application, approximately 19 facilities are in operation, 4 are under construction, and 28 are in various stages of development. Of these sites, 8 are in the United States. Sites in the United States involve ammonia and ethanol production, power, direct air capture, and integrated commercial storage hubs for $CO_2$. In the past 19 years, US taxpayers have invested nearly $4 billion in CCUS (Bhambhani (2019). Forbes. Available at Forbes.com).

The success of using CCS to abate the effects of burning fossil fuels on global warming depends on maintaining the carbon dioxide injected into the Earth's subsurface in situ. Thus, any significant risk of future loss of the $CO_2$ stored in the Earth is not acceptable.

CCS depends on storing CO2 in deep geological formations underground. Geology varies greatly by region, and accordingly certain areas are more suitable than others. For example, within the United States, geological formations within Texas and Louisiana demonstrate the highest potential for CCS endeavors, while states like Maine, Vermont, and Wisconsin may have no storage potential at all (World Resources Institute Blog (2010) available online at wri.org). Only an estimated 1-4% of available geologic capacity will actually be used for CCS. Id. "The important point to remember in discussions about CCS is that every geologic reservoir, and thus every CCS site, is unique. The only way to answer remaining uncertainties about CCS, and bring the cost down over time, is through demonstrations and commercial deployments—in other words, real-life, site-specific scenarios—as soon as possible." Id.

I have previously developed several technologies related to the analysis of petroleum-producing properties of geologic sites, particularly oil wells. These methods involve the collection of site samples, such as petroleum drill cuttings, subjecting the cuttings to one or more forces that permit the release of volatile compounds associated with the samples ("rock volatiles"), and the analysis of such rock volatiles, such as through cryogenic trapping, controlled warming release, and mass spectrometric analysis. See, e.g., U.S. Pat. Nos. 10,190,413; 10,260,336; and 10,494,919 (the "Smith patents"). One of the rock volatile analytes disclosed in the Smith patents which can be indicative of the petroleum content of such samples is carbon dioxide. However, the Smith patents also describe carbon dioxide is usually a poor analyte for such purposes, given the potentially competing sources of carbon dioxide in the environment. PCT application number PCT/US/1949613, filed Sep. 5, 2019 and published as WO202005129, (also referred to herein as the "'259 PCT application," the "'259 WO application," or simply the "'259 application"), and related US bypass continuation-in-part application Ser. No. 17/194,194 (referred to herein as the "'194 application"), filed Mar. 5, 2021, also directed to my own prior work, further describe the use of similar methods to evaluate the carbonate grain character, e.g., coarseness, of rock(s), including petroleum drill cutting samples, which methods specifically comprise causing the release of carbon dioxide (and carbon dioxide-related compounds) from such rocks and analyzing such compounds to evaluate the rock properties of samples.

SUMMARY OF THE INVENTION

I have now surprisingly invented new and useful analytical methods that can be used to assess characteristics of geologic sites with respect to the site's overall carbon dioxide storage capability, changes in carbon dioxide content of the site over time, and other characteristics. These inventive methods can be useful in, for example, assessing the suitability of site(s) for carbon sequestration, assessing the stability of a site during carbon sequestration, and related applications. A first step in mitigating the loss of $CO_2$ from subsurface reservoir(s) used for CCS/CCUS is to determine whether or not those reservoirs have lost $CO_2$ in the past. Rock volatiles carbon dioxide levels can provide researchers with the ability to make such an assessment. Thus, in one aspect this invention comprises a method of evaluating the loss of carbon dioxide from a site or at least from portions of a site and, in a further aspect, using such information to assess the suitability of the site or a portion of the site for CCS/CCUS applications. Rock volatile carbon dioxide analyses of site(s), such as petroleum well(s), can reveal instances where the $CO_2$ that is naturally contained in such subsurface reservoirs has been lost. Risks of $CO_2$ loss from the subsurface that can be identified by performing such methods include 1) loss of $CO_2$ from subsurface reservoirs by a reduction in formation pressure associated with oil and gas production from oil and gas wells, 2) loss of $CO_2$ from subsurface reservoirs by a reduction in formation pressure from natural reservoir seal failure, that is, caused by disruptive features (such as faults) (which in either case may be identified by the presence of very low carbon dioxide levels in some or all of a site), and 3) migration of carbon dioxide out of a part/area of a formation into another (which may be reflected by anomalously high carbon dioxide levels, such as about 50%, about 75%, about 100% (2×), about 150%, about 200%, about 250% or even more above the levels of carbon dioxide in surrounding areas). By applying the results of carbon dioxide rock volatiles analysis to site(s) potentially having such features, the presence of such losses can be detected, and this represents another aspect of the inventive methods described here.

In one exemplary facet, this invention provides a method of assessing the carbon dioxide sequestration characteristics/capability of a geologic site comprising (a) obtaining a sufficient number of geologic samples from the site (e.g., drill cuttings) to characterize the carbon dioxide sequestration characteristics of the site, (b) measuring the rock volatiles carbon dioxide level associated with the samples (e.g., applying the methods of the Smith patents for releasing and measuring rock volatiles), and (c) determining if the level of rock volatiles carbon dioxide in the site or a part of the site are indicative of carbon sequestration capability in the site, the area to which the site belongs, or both. In one aspect, the assessment is of the actual site. In one aspect, step (c) of the method does not comprise assessing levels of carbon monoxide, carbon monoxide-related compounds (e.g., formic acid), or carbon dioxide-related compounds (e.g., carbonic acid or bicarbonate). In a more particular aspect, the amount of rock volatiles carbon dioxide is the only rock volatiles measurement used in performing step (c). In one aspect, the method is performed before carbon sequestration. In one aspect, the indication of low carbon dioxide, or an indication of carbon dioxide loss, from the site, the area, or a zone in the site, evidence of carbon dioxide migration through a site, or a combination thereof, is/are used to avoid the use of the site for a CCS/CCUS application or to limit the CCS/CCUS application to particular zones in the sites or parts of the area. In one aspect, the results of the method are used to provide a risk assessment for stably containing sequestered carbon dioxide in the site, area, or a proximate site. In one aspect, the samples used for the analysis are samples obtained from prior activity in the site or a proximate site, such as old drill cuttings. In one aspect, the amount of carbon dioxide rock volatiles detected in the method, the difference in the amount of carbon dioxide in the site, or both, is at least about 1.25×, at least about 1.5×, about 1.75×, or about 2× greater than or less than the amount of rock volatiles carbon dioxide or differences in rock volatiles carbon dioxide that is associated with the release of $CO_2$ from carbonate grain rocks, clastic sedimentary rocks, or both.

In one variation of the method described in the facets and aspects of the invention described in paragraph [0008] above, the method comprises comparing the results of performing steps (a) and (b) on samples obtained from at least two different but nearby and typically related sites in an area (such sites also being described herein as "proximate sites"). A "site" will typically mean an integrated area from which samples are collected, such as a petroleum well. There may be two, three, four, six, eight, or even more sites in any given area that defines a set of proximate sites. An "area" in this respect can be any part of a geologic formation that is defined by distance or depth (usually both distance and depth), and typically also based on rock properties and features of the area (e.g., the inclusion of oil wells or other potential sites for carbon sequestration). An area can be, for example, a region having a distance of about 0.5 miles, about 0.75 miles, about 1 mile, about 1.25 mile, about 1.5 miles, or about 2 miles and having a depth of about 0.25 mile, about 0.5 miles, about 0.75 miles, about 1 mile, 1.25 mile, or about 1.5 miles. In one aspect of such a variation of the method, the method further comprises validating that the rock composition of at least two of the at least two different sites are similar. In one aspect, assessing the similarity of the rock composition comprises evaluating the mechanical strength of geologically equivalent samples. In one case, the mechanical strength of the rock samples obtained from potentially related proximate sites is assessed by applying force on at least two sides of the samples (e.g., top and bottom sides, right and left sides, or three or four sides). In a particular representation of such an inventive method, the method also or alternatively comprises crushing each sample in a volatiles-impervious crushable container (such as the devices described in the Smith patents) and measuring the relative amount of crushing of the containers. In some cases, the $CO_2$-containing rock volatiles also or alternatively are extracted from the container for analysis of carbon dioxide after the container is crushed. In a further exemplification of the inventive method, the crushing of the crushable containers is measured after volatiles extraction.

In another variation of the facets/aspects described in paragraphs [0008] and above, the method also or alternatively comprises capturing the rock volatiles including rock volatile carbon dioxide in a cryogenic trap and releasing the volatiles by heating. In one case, the method further comprises measuring carbon dioxide in the released volatiles by mass spectrometry. In another case, the amount of carbon dioxide released from the rock volatiles is also or alternatively measured by any other appropriate analytical method.

In still another variation of the methods of the facets/aspects described in paragraphs [0008]-[0010] above, the method comprises comparing the carbon dioxide levels between different parts of the site (or "zones") to identify parts of the site (zones) that are more or less suitable for carbon sequestration (making it possible to develop a "map" of high carbon dioxide zones, low carbon dioxide zones, or both, or of suitable/unsuitable zones for retention of carbon dioxide). In exemplary aspects of this variation, the method comprises identifying areas associated with an at least about 10%, at least about 20%, at least about 25%, or at least about 33%, such as, e.g., a 10%-90%, e.g., 15%-95%, 15%-90%, 20-90%, or 20-80% decrease or increase in carbon dioxide in a region of at least about 300 feet, at least about 400 feet, at least about 500 feet, or more, in one or more directions as compared to a second region of the site of at least about 300 feet, at least about 400 feet, at least about 500 feet, or more, in one or more directions. In one aspect, the method further comprises factoring in real-world information about the site to the analysis (e.g., information about the location of faults, information about wells, information about changes in rock composition, and the like). In one aspect, the method does not comprise reporting on the petroleum/oil content of the site. In one aspect, the method also or alternatively comprises reporting on carbon dioxide levels that are at least partially independent of oil/petroleum content, carbonate rock content, or both, in the site, area, or both. In one aspect, the method does not comprise reporting on carbonate rock content. In one aspect, carbon dioxide rock volatile content is reported separately from any other rock volatile content in the performance of the method. In one aspect, no other rock volatiles are measured in the performance of the method. In one aspect, the method also or alternatively comprises no factoring, accounting, or method to isolate the carbon dioxide content attributable to petroleum content in the site, with the possible exception of degraded oil content in the site in some aspects described below. In one aspect, the output of performing the method does not comprise reporting on petroleum content, carbonate rock content, or both, in the site. In one aspect, the method also or alternatively does not comprise the analysis of carbon-dioxide related compounds or de-prioritizes the analysis of carbon-dioxide related compounds as compared to the direct measure of rock volatiles carbon dioxide. However, in other aspects, the method comprises both performing rock volatiles carbon dioxide analysis and analysis of one or more rock volatiles that are indicative of the presence of petroleum in the site, as exemplified in Example 2, as such methods can reveal additional information about the characteristics of the site. Thus, in one aspect, the method comprises measuring one or more additional rock volatiles that comprise volatiles associated with the presence of petroleum, such as carbon monoxide, carbon monoxide-related compounds (such as formic acid), or $C_4$-$C_{12}$ hydrocarbons. In a more general sense and alternative variation of the methods described herein, the invention also provides methods wherein the method further comprises evaluating the content of one or more additional rock volatiles that can be indicative of changes in the composition of a site or an area. In one case, the one or more additional rock volatiles comprise volatiles that are gasses under typical atmospheric conditions, such as methane, helium, and combinations thereof. It also may be possible that any such compounds can be used as a signal to perform a carbon dioxide analysis of a site, zone, or area; can be combined with carbon dioxide rock volatiles analytical methods such as those described throughout this disclosure; or can be even used as an alternative to analyzing carbon dioxide rock volatiles (as a substitute in the various methods described herein) with the intent of achieving any of the analytical outcomes described herein, such as evaluating the suitability of a site as a CCS/CCUS site (whether ongoing or prospectively). Thus, for example, the invention provides in a further aspect a method of evaluating the carbon sequestration capacity of a site comprising (a) obtaining a plurality of geologic samples from the site sufficient for analyzing the rock volatiles carbon dioxide properties of at least a portion of the site, (b) measuring the level of one or more non-$cO_2$ (and typically non-$CO_2$ associated) and non-CO (carbon monoxide) (and typically non-CO associated) rock volatiles in the samples that (i) are gasses under normal atmospheric conditions, (ii) have a molecular weight of about 50 or less, or (iii) meet both criteria (i) and (ii), and (c) determining if the site or one or more zones thereof are associated with levels of such one or more volatiles are indicative of carbon sequestration capability or lack thereof. In one case, the one or more non-$CO_2$/non-CO rock volatiles comprise helium, methane, ethane, or propane. In one case, such additional volatiles comprise helium (e.g., includes a detectable/significant amount of helium).

In further variations of the facet/aspects described in paragraphs [0008]-[0011] above, the amount of carbon dioxide and carbon dioxide attributable to fluid inclusions also or alternatively is less than about 20%, less than about 10%, less than about 5%, less than about 2%, or less than about 1%. In still further variations, the method also or alternatively comprises assessing at least about 20 samples, at least about 40 samples, at least about 50 samples, or at least about 100 samples from each relevant site involved in the method.

In a further variation of the facet/aspects described in paragraphs [0008]-[0012] above, the method is performed upon the occurrence or discovery of an event or condition and the method is used to assess if an event or hazard has compromised the suitability of the site for use as a CCS site, CCUS site, or both. In one aspect, the method is used to assess the suitability of a CCUS site after the discovery of a condition or the occurrence of an event. In such aspects, as well as in any of the other variation facets, aspects, cases, etc., the method may comprise obtaining samples from a part of the site that does not interrupt the integrity of a part of the site in which CCS or CCUS is planned, ongoing, or both.

In still another variation, the method comprises comparing the amount of rock volatiles $CO_2$ measured in step (b) of the facet described in paragraph [0008] (as modified by any of the other preceding paragraphs), for some or all of the samples or some or all parts of a site (or sites or collections from different times, depending on the method), against a pre-developed standard (e.g., a standard developed to assess if the amount of carbon dioxide retained by a portion of the site is sufficient).

In another facet, the invention provides a method that comprises performing steps (a) and (b) of the method described in the facet of paragraph [0008] (as modified by any suitable aspects of any of the other preceding paragraphs) on the samples collected in step (a) and a second set of samples obtained from the site or a proximate site significantly before or after the collection of the samples collected in step (a) as described. In one case, such a method is used to assess changes in the ability of the site to sequester carbon dioxide over time. For example, if there has been seismic activity in the area, the performance of the method on samples from the area before the activity and after the activity can reveal information about how much carbon dioxide is contained in the area, which can indicate the ability of the area to maintain carbon dioxide.

In still a further facet, the invention provides a method of assessing the potential carbon dioxide release impact of a proposed subterranean operation, such as, e.g., a new drilling operation, in a site in an area comprising performing steps (a) and (b) of the method of the facet of paragraph [0008] (as modified by any suitable aspects of any of the other preceding paragraphs) on a site that is proximate (and ideally geologically related) to a proposed site of a new drilling operation to assess the potential loss of carbon dioxide from the site if the proposed drilling was to be performed.

In still a further method of assessing the carbon dioxide release associated with a subterranean activity (e.g., a drilling operation, such as a new petroleum drilling operation) comprising performing steps (a) and (b) of the facet of paragraph [0008] (as modified by any suitable aspects of any of the other preceding paragraphs) on samples obtained from the site of the subterranean activity and on samples from a proximate and related site to assess the release of carbon dioxide associated with the subterranean activity. In this respect, methods of the invention can be used to assess the carbon dioxide release impact of such operations, which can inform policymakers, regulators, and producers of the impact of their activities. Where "carbon footprint" requirements are in place, such information can inform entities the amount of carbon dioxide that will have to be sequestered or otherwise offset to make up for the carbon dioxide release associated with the activity.

In yet another facet, the invention provides a method of assessing changes in subterranean carbon dioxide over time in a site comprising (a) obtaining a sufficient number of geologic samples from the site at a first period; (b) measuring rock volatiles carbon dioxide level associated with the first period samples; (c) determining the carbon dioxide content of the site in the first period; (d) obtaining a sufficient number of geologic samples from the site, a proximate site, or both at a second period ("second period samples"); (e) measuring rock volatiles carbon dioxide level associated with the second period samples; (f) determining the carbon dioxide content of the site in the second period; and (g) comparing the difference in the carbon dioxide content in the site in the first and second periods to evaluate the change in carbon dioxide content of the site, area, or both between the first period and second period. In this respect, the invention provides means for assessing changes in carbon dioxide levels in subterranean environments, such as CCS and CCUS sites, over periods. Such methods can include measuring carbon dioxide rock volatile levels at three or more times, four or more times, five or more times, in the same site, proximate sites, or both. The use of samples from a site proximate to a target site can be useful in not disrupting the ability of the target site to maintain carbon dioxide, which can be important in the context of CCUS and CCS sites.

In still a further facet, the invention provides a method of evaluating the degree of microbial degradation of oil in an oil deposit potentially exposed to microbial contamination comprising (a) identifying a site that is associated with a petroleum deposit where there is potential microbial contamination, (b) obtaining a sufficient number of geologic samples from the site or a geologically related site collected during a first, earlier, period and a sufficient number of geologic samples from the site collected during a second, more recent, period; (c) measuring rock volatiles carbon dioxide level associated with the first period and second period samples; and (d) determining the carbon dioxide content of the site, to assess the degree of microbial degradation associated with a part, some, most, or all of the site. In one aspect, such a method further comprises comparing the rock volatiles carbon dioxide measures from the area of potential microbial contamination to other areas of the site.

In yet another facet, the invention provides a method of evaluating the impact of a first site on a second (or more) site's suitability for CCS/CCUS activity comprising use of evidence of bio-degradation for such an evaluation, the method comprising (a) analyzing samples from a second site (or two or more additional sites—e.g., a second site, third site, etc.), (b) evaluating the results of the analysis for indications of bio-degradation, (c) evaluating/considering the proximity of one or more locations within the second (or more) site's to the first site, and (d) determining if biodegradation shift(s)/change(s)/pattern(s) observed in the second (or more sites) align with spatial relationships (e.g., proximity) to the first site. In aspects, methods herein, such as the method of this paragraph and methods described in other aspects/paragraphs of this disclosure, can be used to identify communication channels or likely fluid (e.g., petroleum, air, gas, etc.) communication channels between a first site and a second site, e.g., communication channels capable of communicating air and microbes, such communication channels leading to detectable or significant biodegradation which can be indicative of a site's inability, risk, or lesser relative ability to participate in successful CCS/CCUS activity(ies).

In some aspects, the invention herein describes a method of evaluating active (ongoing) changes in carbon dioxide content in a geological formation comprising obtaining several rock samples (e.g., petroleum drill cuttings) associated with different parts a site that comprises one or more characteristics that indicate carbon dioxide contents are changing in the site (e.g., the presence of a fault in the site), measuring the amounts of carbon dioxide rock volatiles in the samples, and determining if there are two or more zones of significantly different levels of carbon dioxide content in the site (e.g., a difference of at least about 50%, at least about 75%, at least about 100%, at least about 150%, at least about 200%, at least about 250%, at least 300%, or of any measurement that is statistically significant). Such a site from which samples are collected can be a former oil and gas production site under evaluation for carbon sequestration. Such a site can be a site that has been demonstrated not to be leaky to buoyant fluids, such as natural gas or oil; however, the method of the present invention proves otherwise, identifying the leakage of carbon dioxide from the site. Such an assessment may lend itself to identifying the site as not being a prime candidate for successful carbon dioxide sequestration.

In some aspects, the analysis of carbon dioxide rock volatiles is combined with the analysis of one or more other rock volatile compounds, such that the presence or absence of such other rock volatile compounds is informative as to whether or not the site is suitable for successful carbon dioxide sequestration. In some aspects, the relative presence of such other one or more rock volatile compounds within a specific location of a site, e.g., a specific location within a drilled well such as a feature, as in a fault, compared to the presence of such other one or more rock volatile compounds within a different one or more locations of a site, e.g., a location within a drilled well apart from the feature such as a fault, is indicative/determinative concerning whether or not a site is leaking or has leaked carbon dioxide and hence may or may not be suitable for carbon dioxide sequestration. In certain facets, rock volatile analysis, inclusive of or excluding carbon dioxide analysis, including indicators such as permeability, is informative as to whether or not the site is suitable for successful carbon dioxide sequestration. In some aspects, the relative presence of such one or more rock volatile compounds across a collection of samples representative of the span or partial span of a well (e.g., across the span of a lateral well), or representative of the depth or partial depth of a well (e.g., across the depth of a vertical well), or changes in characteristics across the span or depth of a well, such as, e.g., permeability, can be indicative of the presence of a feature (e.g., a fault) which may make the site unsuitable for CCS/CCUS applications. In aspects, mechanical strength data can be collected on a collection of samples representing the same span or depth of a well, or, e.g., collected on the same set of samples used for rock volatiles analysis, and relative changes in mechanical strength in different locations across the span/depth of the well can (alone or in conjunction with rock volatile analysis datum/data) indicate or further validate the presence or suspected presence of a feature such as a fault. In aspects such data can be used to assess the suitability of the site for CCS/CCUS application(s). Therefore, in some aspects, step (b) of the method can comprise the analysis of CO2, one or more other rock volatiles, rock characteristics such as permeability or mechanical strength, or any combination thereof.

In some aspects, a formation can contain a geological feature that is expected to be associated with carbon dioxide loss from a part of (e.g., a location within) a site, such as a fault, an intersecting well, or the like. In some aspects, the method described herein comprises assessing changes in rock volatiles carbon dioxide levels in different parts of a formation, such as in two or more areas of a formation comprising the feature such as a fault and one or more areas of the formation more distant to (more separated from) the geologic formation feature (e.g., one or more sites that are at least about 100 ft, at least about 250 ft, at least about 350 ft, at least about 500 ft, at least about 750 ft, or at least about 1000 ft away from the feature). In some aspects, there can be two or more areas of a formation separated by such a described feature, and assessments of changes in rock volatiles carbon dioxide levels in the parts of the formation separated by the feature can be made. Such an assessment, e.g., the identification of such a feature, can be made by the application (e.g., the use of) gamma-ray analysis.

According to aspects of the invention herein, the method comprises determining the level of other gases through rock volatiles analysis in combination with the carbon dioxide analysis, such other rock volatiles including but not being limited to one or more of methane, ethane, propane, butane(s), one or more $C_5$-$C_{10}$ paraffin(s), one or more $C_6$-$C_{10}$ naphthene(s), or one or more $C_6$-$C_8$ aromatic(s), or any combination thereof from the samples, wherein changes in one or more of such other rock volatiles content is (are) indicative of gas loss from parts of the formation. In some specific aspects, such other rock volatiles comprise, primarily comprise, generally consist of, or consist of methane. In one aspect, only methane, only carbon dioxide, or a combination thereof are used as the primary indicators obtained from rock volatiles as to the suitability of the site for carbon sequestration activities.

The invention herein provides a method comprising obtaining rock volatiles carbon dioxide level data from several rock samples of a site that determines the level of past loss of carbon dioxide from the site; determines the level of carbon dioxide in the site; determines the level of ongoing carbon dioxide migration into or out of the site; or a combination of any or all thereof, and provides an ability to evaluate the suitability of the site based on such rock volatiles carbon dioxide data. This type of method can be applied to a site that has been proposed as, or a site being actively used for, carbon sequestration.

In some aspects, if being used to monitor an active carbon sequestration site, the rock volatiles carbon dioxide data, optionally in combination with the rock volatiles data from one or more other rock volatiles as previously described (e.g., methane), can be combined with data obtained from monitoring previously detected carbon dioxide loss (e.g., a loss that is no longer ongoing), ongoing loss previously detected, or active carbon dioxide migration through/from/ into a site, and further optionally in combination with other prior, previously ongoing, or currently ongoing of losses or additions of carbon dioxide or other fluids in the site, to evaluate the condition of the carbon sequestration site.

These facets, aspects, cases, and the like, and additional features, characteristics, and representations of the invention will be described in further detail in the Detailed Description and List of Exemplary Aspects portions of this disclosure, which follow.

DESCRIPTION OF THE DRAWINGS/FIGURES

FIG. 1 is a graph of carbon dioxide rock volatile levels obtained from two proximate oil well sites (about 0.75 miles apart in some places) (wells 1 and 2, respectively), reflecting areas of similarity and difference between the two sites in terms of carbon dioxide rock volatile levels.

FIG. 2 is a graph showing the mechanical strength of petroleum cuttings from both well 1 and well 2, reflecting the consistency in rock properties between site 1 and site 2.

FIG. 3 is a graph of carbon dioxide rock volatile levels obtained from an oil well (site 3) in a different region of the world, reflecting an upper zone of carbon dioxide rock volatiles retention and a lower zone associated with both an expected fault and significantly reduced carbon dioxide rock volatiles levels.

FIG. 4 includes the graph shown in FIG. 3 in combination with a graph of petroleum-associated rock volatiles from the same well.

FIG. 5 includes ten graphs (labeled A-J) of carbon dioxide rock volatiles levels released from petroleum drill cuttings from 10 wells.

DETAILED DESCRIPTION OF THE INVENTION

Figure 1:
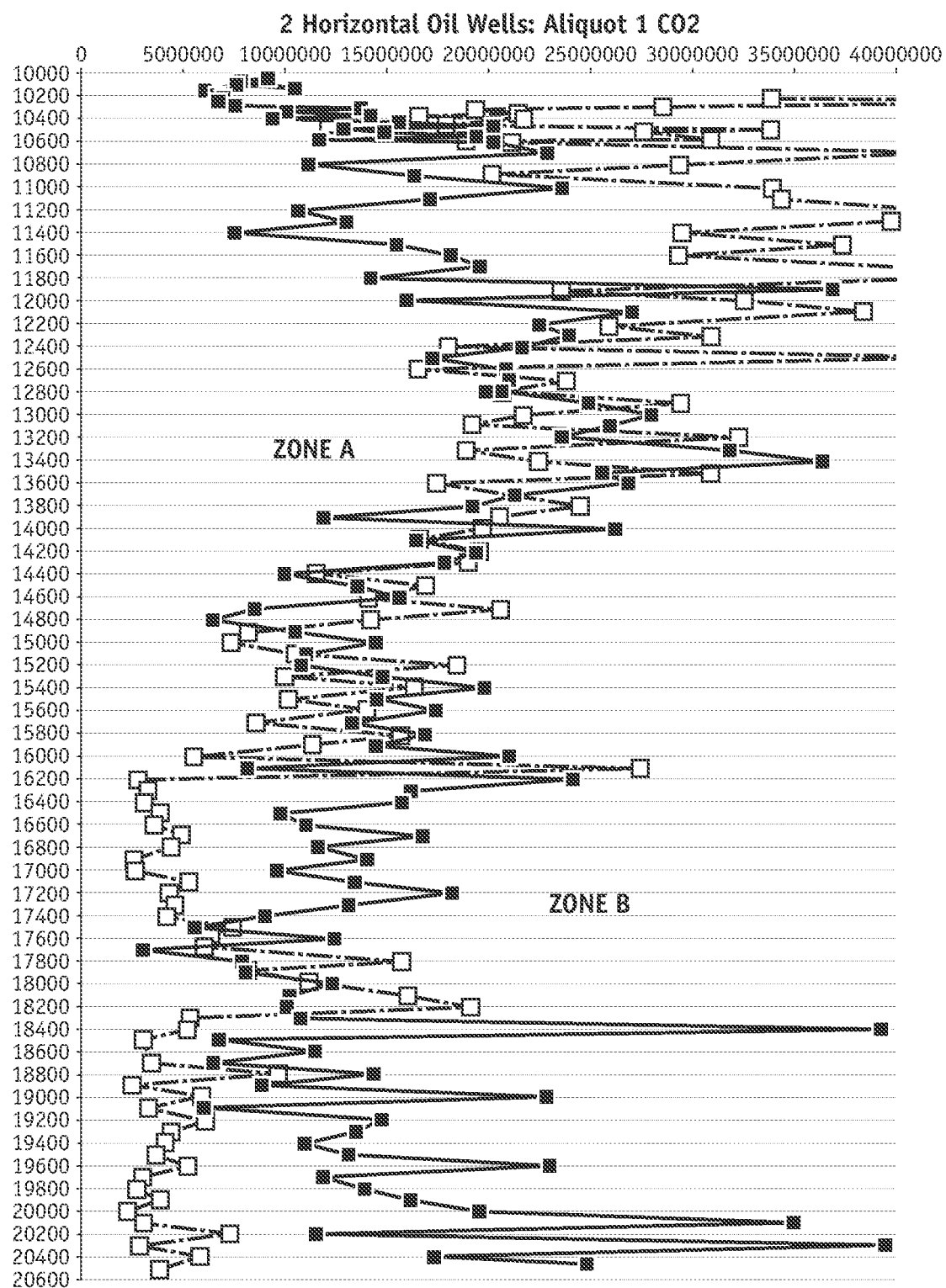

Disclosed herein are new methods of using rock volatiles data, and in aspects specifically carbon dioxide content, obtained from samples of one or more subterranean sites; methods of monitoring changes in rock volatile carbon dioxide content in sites over time; methods of evaluating carbon dioxide properties of a site based on the use of information from one or more proximate sites in an area; and methods of identifying disruptive geological features which may make particular sites more or less suitable for CCS/ CCUS endeavors. While the methods of the Smith patents can be used to extract rock volatiles, isolate carbon dioxide rock volatiles, and to analyze the amount of rock volatiles, e.g., carbon dioxide rock volatiles, in samples, the application of such methods to assess such matters reflects new and unexpected useful applications of such methods to overcome problems not envisioned by earlier inventions or any description thereof. In one exemplary facet, the invention provides a method of assessing the carbon dioxide sequestration capability of a geologic site comprising (a) obtaining a sufficient number of geologic samples from the site, (b) measuring rock volatiles carbon dioxide level associated with the samples, and (c) determining if any areas are associated with levels of rock volatiles carbon dioxide that are indicative of carbon sequestration capability. This facet of the invention and other facets, aspects, cases, representations, and exemplifications of the invention will be described in further detail below, following a discussion of the Principles of Construction that should be considered in interpreting this disclosure.

Principles of Construction

To aid in the understanding of the disclosure provided herein, the following principles should be considered.

Any heading(s) and sub-heading(s) (e.g., "Principles of Construction") are used for convenience only and should not be construed as limiting the invention in any way.

Terms such as "here" and "herein" means "in this disclosure". The term "i.a." (sometimes "ia" or "ia") means "inter alia" or "among other things."

The use of the terms "a" and "an" and "the" and similar referents in the context of this disclosure are to be construed to cover both the singular and the plural, unless otherwise indicated herein or clearly contradicted by context.

The modifier, "detectable or significant"/"detectably or significantly", "significant" means results that are statistically significant using an appropriate test in the given context (e.g., $p \leq 0.05/0.01$).

Lists of elements can be employed for conciseness. Unless indicated, each member of each list is an independent aspect of the invention.

The recitation of ranges of values in this document is intended to serve as a shorthand method of referring individually to each separate value falling within the range within an order of magnitude of the order of the recited range, including the endpoints. For example, a recited range of 1-2 should be interpreted as providing support for 1.0, 1.1, 1.2, 1.3, . . . 1.9, and 2.0 and a recited range of 10-20 is to be interpreted as providing support for 10, 11, 12, 13, . . . 19, and 20. Unless otherwise indicated, each such separate value is incorporated into the specification as if it were explicitly individually recited herein. All ranges provided herein include the endpoints of the provided range, unless the exclusion of such endpoints is clearly stated or clearly indicated, regardless of the terminology used to describe the range. Unless otherwise stated, all exact values provided herein are representative of corresponding approximate values and vice versa (e.g., all exact exemplary values provided with respect to a particular factor or measurement can be considered to also provide a corresponding approximate measurement, modified by "about," where appropriate— e.g., disclosure of "about 10" is to be understood as also providing support for 10 exactly).

Terms of approximation, such as "about" are used herein where measurements are understood to vary due to measurement issues such as limits of detection or sampling variability. The scope of such terms will depend on the context of the element at issue and the understanding of those skilled in the art. In the absence of typical guidance in the art, through relevant teachings or examples, the term "about" should be understood as meaning +/−10% of the indicated value(s). The term "approximately," is to be similarly interpreted.

Use of the term "or" herein is not meant to imply that alternatives are mutually exclusive. In other words, "or" means "and/or". The occasional explicit use of "and/or" herein does not affect this interpretation of "or." The scope of "or" meaning "and/or" in a phrase such as "A, B, or C" implicitly supports each of A, B, & C; A, B, or C; A or C; A or B; B or C; A & C; A & B; B & C; A (alone); B (alone); & C (alone).

All methods described herein can be performed in any suitable order unless otherwise indicated herein or otherwise clearly contradicted by context or plausibility. Unless clearly indicated or contradicted by context or plausibility, the elements of a composition/device disclosed herein can be formulated/constructed in any suitable manner and by any suitable method. Unless otherwise explicitly stated or clearly contradicted by context, any combination of the various elements, steps, components, or features of the aspects of the invention described herein, and all possible variations thereof, is to be considered encompassed by the invention.

Numerous examples and aspects are provided in this disclosure to better illuminate the invention. No example, particular aspect, or combination or pattern thereof is intended to pose a limitation on the scope of the invention unless otherwise indicated. No language in the specification should be construed as indicating any element is essential to the practice of the invention unless as much is explicitly stated. The breadth and scope of the present invention should not be limited by any of the exemplary embodiments.

Although this document provides support for "means-plus-function" style interpretation of certain elements of the invention, both explicitly and implicitly, no element should be interpreted as limited to "means-plus-function" construction unless such intent is clearly indicated. In particular, the use of the terms "configured to" or "adapted to" are not intended to suggest a "means-plus-function" interpretation, but, rather, suggest that the relevant component, composition, device, or element has been configured to, designed to, selected to, or adapted to achieve a certain performance, characteristic, property, or the like using the principles described herein or that are well known in the art.

The use of an element or component in the singular is to be understood as also providing simultaneous disclosure and support for a plurality of the element or component, if supported or otherwise understood to be possible. For example, discussion of a compound in one context should be understood as providing support for one, two, or more compounds unless clearly contradicted by context or an express contradictory statement. The converse also will be understood by those of ordinary skill in the art in reading this disclosure. In other words, the singular is intended to convey the plural and vice versa herein, unless otherwise stated or clearly contradicted by context. The inclusion of "(s)" after an element indicates that one or more of such an element is present, performed, and the like. E.g., an analysis of "X(s)" means analysis of $\geq 1$ Xs.

Terms such as "including," "containing," and "having" should be interpreted openly herein, e.g., as meaning "including, but not limited to," "including, without limitation," or "comprising," unless otherwise such a meaning is clearly contradicted. The description herein of any aspect or embodiment of the invention using terms such as "comprising", "having", or "including" with reference to an element, composition, or set of compositions or elements should be interpreted, whether explicitly stated or not, also as simultaneously implicitly providing support for a similar aspect/ embodiment of the invention that "consists of", "is generally composed of", "substantially comprises", "materially comprises", "predominantly comprises", "largely consists of", "essentially comprised of", and "substantially consists of" that particular element, unless otherwise stated or clearly contradicted by context (i.e., a composition described herein as comprising a particular element should be understood as also describing a composition consisting of that element, substantially comprising that element, predominately comprising that element, largely consisting of that element, and substantially consisting of that element, unless otherwise stated or clearly contradicted by context).

The phrase/term "substantially comprises" means that at least about 1% of a composition, or similar collection or feature is or is made up of/by the referenced feature, species, or element, and typically means (and should be understood as providing support for) the relevant feature makes up or represents at least about 5%, at least about 10%, or even at least about 15% of the total amount of the, e.g., composition.

"Substantially consists of" means at least about 90% of the composition, feature, or the like is made up of the referenced feature, species, or element and should be understood as also providing disclosure that at least about 95%, at least about 99%, or at least about 99.9% of the composition, feature, etc., is made up of the relevant element, feature, or thing. The phrases "nearly all" and "nearly entirely" should be construed similarly. The term "essentially comprised of" should also be construed similarly.

"Generally consists of," "largely consists of," or "generally composed of" means that at least about 75% of the composition, feature, or the like is or is made up of the referenced feature, species, or element at hand and should be understood as providing disclosure that at least 75%, at least 80%, at least 85%, at least 90%, and at least 95% of the composition, feature, or the like is or is made up of/by the referenced feature, species, or element. Obviously, the remaining minority portion of the relevant composition, feature, and the like can be composed of other compounds, materials, or other relevant elements. The phrases "largely all" and "largely most" have similar meanings.

"Predominately comprises" means accounting for more than one half (i.e., more than 50%) of a feature (e.g., a composition or for example a formation). This amount and similar amounts used in respect of defined terms provided herein can be on a weight percent (weight/weight) basis, on a molecule/molecule basis, or other relevant basis used in the context of the relevant disclosure. For example, if a composition is described as "predominately comprising" element/species A, more than 50% of the composition on a molecular and/or weight basis will be made up of element/ species A). Wherever this term is used it should be understood as simultaneously providing support for more than 60%, more than 70%, and more than 80% of the component or composition or feature being made up of the feature, species, or element at issue. The term "most" should also be construed similarly herein. "Materially comprises" means that at least about 20% of a composition, or similar feature is or is made up of/by the referenced feature, species, or element, and typically means (and should be understood as providing support for) the relevant feature makes up or represents at least about 25%, at least about 30%, or even at least about 40% of the total amount of the composition.

The term "appreciably comprises" means at least 1% of the composition is composed of the referenced element/ component. The phrase "appreciably associated" means that at least 1% of a referenced element is associated with another referenced element. Phrases such as "in an appreciable amount" are to be similarly construed.

Changes to tense or presentation of phrases defined herein (e.g., using "comprises predominately" instead of "predominately comprises") will not modify the meaning of the defined phrase, unless otherwise clearly indicated.

Throughout the description, where processes and methods are described as having, including, or comprising specific steps, it is contemplated that, additionally, processes and methods according to the present invention consist essentially of, or consist of, the recited processing steps and support for such embodiments is provided by the disclosure, even where it is not explicitly stated.

All references, including publications, patent applications, and patents, cited herein, including any patents and patent applications that may be cited above such as in the Background of the Invention (the Smith patents and the '259 PCT application), are hereby incorporated by reference to the same extent as if each reference were individually and specifically indicated to be incorporated by reference and were set forth in its entirety herein. Accordingly, the reader should review and consider such references in understanding the full content of this disclosure. For example, unless clearly contradicted by context or explicit statement, the disclosure of such documents relating to formulations, methods of production, and methods of use of compositions and devices can be combined with the teachings provided herein to provide additional useful compositions and applications. However, the reader should understand that the citation and incorporation of patent documents herein are limited to the technical disclosure of such patent documents and does not reflect any view of the validity, patentability, or enforceability of any claims of such patent documents. Moreover, in the event of any conflict between this disclosure and the teachings of such documents, the content of this disclosure will control concerning properly understanding the various aspects of the invention.

The embodiments described herein are described in sufficient detail to enable those skilled in the art to practice the invention. It is to be understood that other embodiments may be utilized without departing from the scope and spirit of the present invention. The following detailed description should not be taken in a limiting sense, and the scope of the present invention is defined by the included claims, aspects and/or equivalents thereof.

Unless clearly indicated, the scope of any aspect or embodiment of the present invention is not limited to particular processes, compositions, or methodologies described, as these may vary. The terminology used in the description is for the purpose of describing particular versions or embodiments only; and is not intended to limit the scope of the present invention. Unless defined otherwise, all technical and scientific terms used herein have the same meanings as commonly understood by one of ordinary skill in the art. Any methods and materials similar or equivalent to those described herein can be used in the practice or testing of embodiments of the invention, the methods, devices, and materials described herein.

The description of the specific embodiments provided herein will reveal the general nature of the invention such that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. In general, it is to be understood that the phraseology or terminology herein is for the purpose of description and not of limitation, such that the terminology or phraseology of the present specification is to be interpreted by the skilled artisan in light of the teachings and guidance.

Specific terms are used herein to describe elements and applications of the invention. While the terms "well" and "borehole" can sometimes be used in common parlance distinguish mechanisms of drilling (e.g., a borehole typically drilled by machine and being small in diameter, a well typically being sunk by hand and being relatively larger in diameter), herein the two terms are used interchangeably to describe a vertical or horizontal shaft in the ground, commonly used herein to describe a petroleum well. The terms well or borehole should be interpreted as being applicable to petroleum wells, whereby either or both of oil and gas are produced. As used herein, the term well/borehole is a petroleum well (e.g., either an oil or a gas well), a carbon capture storage well, or a geothermal well. The term "well" as used herein is inclusive of producing and non-producing wells, online wells, wells not yet brought online, and dry (non-producing) wells (e.g., in aspects the methods herein can aid in the evaluation of, or determine, whether such a dry well may be a suitable CCS/CCUS site). The term "reservoir" is used to describe a geological formation or portion of a formation that includes sufficient porosity and permeability to store and transmit fluid, primarily oil, or, in aspects, a gas such as carbon dioxide.

A "formation" is understood in the art to mean an identified area of strata having similar lithology. In some cases, a formation also may be defined by other characteristics, such as biostratigraphic characteristics, chemostratigraphic characteristics, or both, and sometimes such characterizations of a formation are used interchangeably. Typically, a formation is a series of strata/beds that is distinct from other beds above and below and is thick enough to be shown on the geological maps that are widely used within the area in question. Formations dominated by a rock typically include the dominant rock in the formation's name (e.g., the "Woodford Shale Formation" found in several parts of Oklahoma). However, formations in some cases can contain a variety of related or interlayered rock types, such as the Summerville Formation of Utah, which consists of thin alternating beds of shale, siltstone, and sandstone. Formations can be divided into sub-formations or "members" based on such characteristics.

In petroleum production the term "play" is used to indicate a region defined by a group of oil fields (each comprising many wells/sites) that generally share the same set of geological circumstances (e.g., formations present). Oklahoma, USA, for example, has many plays but two notable ones making headlines across the nation are the "SCOOP" (South Central Oklahoma Oil Province) and the "STACK" (Sooner Trend Anadarko Basin Canadian and Kingfisher Counties). The petroleum-rich STACK play is characterized by presence of Oswego, Meramec, Osage, and Woodford formations. Plays can be divided into "regions" or "areas" comprising two or more (often several) sites, potential sites, or both. A typical "site" is a petroleum well or an area of prospective petroleum drilling within an area or play. In aspects, related samples can be obtained from multiple sites within a single play. The term "geologic unit" is used to refer to any discrete geologic area from which suitable samples are obtained for use in the methods herein.

General Methods of the Invention

In one facet, the invention provides a method of assessing the total, or overall, rock volatile carbon dioxide characteristics of a geologic site comprising (a) obtaining a sufficient number of geologic samples from the site, (b) measuring the rock volatiles carbon dioxide level associated with the samples, and (c) determining if any areas are associated with levels of rock volatiles carbon dioxide that are indicative of the carbon sequestration and storage capability of the site. In one aspect, step (c) does not comprise assessing levels of carbon monoxide, carbon monoxide-related compounds (e.g., formic acid), or carbon dioxide-related compounds (e.g., carbonic acid or bicarbonate). In aspects, the carbon dioxide in a formation that is detected in the performance of the methods described herein can include carbon dioxide that is generated from the dissociation of these compounds, e.g., by their release to the gas phase as a result of pressure drops in a compromised reservoir. In one aspect, the amount of rock volatiles carbon dioxide is the only rock volatiles measurement used in performing step (c). Thus, for example, the step of assessing the results of performing steps (a) and (b) on samples from a site or proximate site, in this or any of the other methods described herein, does not comprise an assessment of oil-saturated water, C4-C12 hydrocarbons, or the like, in performing the evaluation step (in this case in assessing whether the levels of rock volatiles carbon dioxide are indicative of suitability for carbon sequestration and storage). Thus, in such aspects, while such compounds can be measured along with rock volatiles carbon dioxide, the levels of such other compounds present as rock volatiles in samples are, in at least some aspects, not used as the basis of evaluating the carbon dioxide retention ability of a site. In alternative aspects, an assessment of oil-saturated water, total water, C1-C12 hydrocarbons, or the like are used as a component of an evaluation of CCS/CCUS site feasibility. In aspects, analysis of such components can indicate features of the site which can make it unsuitable for such applications, such as, e.g., analysis of such components can indicate the presence or likely presence of a fault within the site.

The "total" or "overall" rock volatile carbon dioxide characteristics means the carbon dioxide characteristics of the site beyond the carbon dioxide characteristics associated with the presence or lack of petroleum products, such as oil, in the site. While petroleum products can be a source of rock volatile carbon dioxide, the above-described method and methods generally described herein are not limited to detecting the presence or absence of petroleum, except where explicitly noted. It is possible that a site can contain a large amount of rock volatile carbon dioxide that is not associated with petroleum, such as in a CCS or CCUS site or an area associated with one or more CCS/CCUS sites. Carbon dioxide in the subsurface mostly exists as dissolved species in water. The $CO_2$ exists as carbonic acid, bicarbonate, and dissolved molecular $CO_2$ in subsurface waters. The amount of $CO_2$ that can be dissolved into subsurface waters can depend on the confinement pressure of the reservoir. The higher the pressure, the more $CO_2$ can be dissolved into water. Thus, rock volatile carbon dioxide levels can in aspects be reflective of the presence of water containing such compounds. In one aspect, the method includes the analysis of one or more of such carbon dioxide related compounds. In one aspect, however, the method focuses exclusively on the analysis of carbon dioxide rock volatiles, and not carbon dioxide-related compounds, at least with respect to the analytical step(s) of the method (e.g., step (c) in the first facet of the invention described above). In aspects, $CO_2$ can also be dissolved in detectable, significant, or, e.g., substantial amounts in oil. In aspects, dissolved $CO_2$ can be the underlying basis for $CO_2$ enhanced oil recovery (EOR), a technique wherein oil is made to increase in volume, e.g., swell, to the extent that it becomes a continuous mobile phase. In aspects, this "swelling" allows for detectably, significantly, or, e.g., substantially more oil to be produced from a depleted field. In further aspects, $CO_2$ can be present in detectable, significant, or substantial amounts in gas.

The steps of (a) obtaining several samples from a site and (b) measuring rock volatiles carbon dioxide level associated with the samples are used in several new and useful analytical methods provided by this invention. Each method also includes an analytical step, such as step (c) of the above-described method, in which the amount of rock volatiles carbon dioxide obtained from samples of a site, a proximate site, or a site or proximate site at a different time is used to analyze a characteristic or potential characteristic of a site, area, proposed activity, ongoing activity, or previously conducted activity. The differences in step (c), which provided different applications of the invention, will necessarily result in changes in steps (a) (sample collection, e.g., specifically in terms of when or from where samples are collected) and, possibly, in step (b). However, it is likely that, in most cases, the steps described in prior patent disclosures (e.g., the Smith patents) for performing step (b) will be useful in any of the methods described herein.

The number of samples obtained and analyzed in step (a) of the method will be any number that is suitable for characterizing the rock volatiles carbon dioxide characteristics of the site in the particular method of the invention. For example, method(s) herein can comprise the analysis of at least about 5, at least about 10, at least about 20, at least about 50, at least about 75, at least about 100, at least about 125, at least about 150, at least about 200, at least about 250, at least about 300, or even more samples, such as at least about 400, at least about 600, at least about 800, or even 1000 or more samples. In aspects, samples are collected in such a manner that they are representative of the site from which they are obtained, e.g., they are representative of the span of a well (e.g., the span of a lateral/horizontal well or, e.g., the span of a vertical well (e.g., representative of the well's full depth). In aspects, samples can be collected which represent every about 2 feet, about 5 feet, about 10 feet, about 20 feet, about 30 feet, about 40 feet, about 50 feet, about 60 feet, about 70 feet, about 80 feet, about 90 feet, or every about 100 feet, such as every about 110 feet, about 120 feet, about 130 feet, about 140 feet, about 150 feet, about 160 feet, about 170 feet, about 180 feet, about 190 feet, or about every 200 feet.

Typically, samples are provided from (or collected from) more than 10 separate locations, such as at least about 20, at least about 30, at least about 40, at least about 50, at least about 65, at least about 75, or at least about 100 locations. In aspects, samples are provided from more than 100 locations, such as at least about 125, at least about 150, at least about 200, at least about 250, or more different locations in a site. In aspects, a suitable number of samples is collected to provide a sufficiently representative set of samples which, upon analysis of such samples, can reflect the characteristics of the site in appropriate detail for the question at hand (e.g., can identify the presence of features of the site which may render the site unsuitable for CCS or CCUS applications).

The samples can be of any nature that includes an analyzable amount of rock material for the methods described herein. In aspects, the samples can be any suitable type of sample for analysis. Usually, the samples are rock samples or comprise rock samples. One example of such a sample is a petroleum drill cutting; however, other materials such as core samples also or alternatively can be used. In some aspects, the amount of material for each sample (maximum amount, average amount, average maximum amount, or a combination of any or all thereof) can be less than about 330 mg, less than about 250 mg, less than about 200 mg, less than about 150 mg, or less than about 125 mg (e.g., about 50-350 mg, such as about 75-300 mg, such as about 80-240 mg, such as about 90-180 mg, such as about 50-150 mg or about 75-125 mg). In some contexts, a relatively large number of samples are used—e.g., at least about 20, at least about 40, at least about 50, at least about 80, at least about 100, at least about 125, at least about 150, at least about 175, or at least about 200 samples, or even at least about 250 samples (e.g., 20-200 samples, 25-175 samples, 25-150 samples, 30-150 samples, 10-180 samples, 30-210 samples, or about 30-120 samples). Samples can be collected by any suitable method. In the case of cuttings, collection can be done by conventional methods known in the art, which are discussed in the Smith patents. In one embodiment, the samples are collected and sealed at the site. In another aspect, the samples are collected but maintained under environmental conditions (unsealed). In one aspect, samples are subjected to artificial aging methods, examples of which are described in WO2019178418, which is incorporated herein by reference. In one aspect, the samples are also or alternatively placed into containers that are impervious to volatile release even upon application of a crushing force, examples of which are also described in the Smith patents.

In certain aspects, the samples are drill cuttings obtained from wells drilled with water-based muds. In alternative aspects, the samples are drill cuttings obtained from wells drilled with oil-based muds. In aspects, the drill cuttings are cuttings collected from sites drilled using Polycrystalline Diamond Compact (PDC) drill bits. According to certain aspects, absolute content of rock volatile(s), including rock volatiles $CO_2$, can be affected by the drilling technology employed. In aspects, samples obtained from a well drilled using a first technology, a first type of drill bit and a second type of drill bit, or an oil-based mud and a water-based mud, can have rock volatile(s), and specifically rock volatiles $CO_2$ absolute amounts which are impacted by the drilling technology, and thus it may not be appropriate to directly compare them. According to such aspects, methods herein can comprise assessing the pattern (e.g., presence, shifts, or changes) of $CO_2$ contents across such sites (e.g., formations) in addition to, or as an alternative to, assessing absolute amounts of rock volatile(s) or rock volatiles $CO_2$. In aspects, the comparison of rock volatile(s) content patterns, e.g., specifically the comparison of rock volatiles $CO_2$ content patterns, across sites (e.g., across formations), can allow for assessment of a site's CCS/CCUS suitability using data collected on samples derived from a plurality of sites when such sites have been drilled utilizing varying technologies.

In alternative aspects, drilling technologies do not substantially (e.g., do not, in aspects, materially, or in aspects significantly) impact the CCS/CCUS site suitability analyses method(s) described herein. In aspects, changes in rock volatiles, e.g., specifically changes in rock volatiles carbon dioxide related to site geology affecting a site's ability to sequester $CO_2$ (e.g., prevent significant $CO_2$ flow or loss) are sufficiently large in scale, such as at least about 2 times greater, 5 times, greater, 10 times greater, 100 times, greater, 500 times greater, 1000 times, greater, 5000 times greater, 10,000 times greater, 100,000 times greater or more, than changes to results attributable to drilling technologies, to render impacts from drilling techniques to be insignificant or insufficient to significantly impact site suitability analysis. This is exemplified, for example, in the Figures provided herein (e.g., FIG. 1 and FIG. 3), whereby CO2 loss within sites is provided on a logarithmic scale.

Step (b) of the method (measuring the amount of rock volatiles carbon dioxide) typically includes several steps, including (i) extraction of rock volatiles carbon dioxide (e.g., by application of pressure (e.g., gentle vacuum), as discussed in the Smith patents), optionally (ii) trapping or concentrating the extracted rock volatiles carbon dioxide (e.g., by application of a liquid nitrogen trap to capture extracted rock volatiles), (iii) optionally releasing the rock volatiles from the trap (e.g., by heating a cryogenic trap), and (iv) analyzing the released/concentrated rock volatiles (e.g., by mass spectrometry analysis of volatiles released from a trap). Examples of particular steps that can make up part of step (b) are discussed below.

In one aspect, in performing steps (a) and (b) as described above, the invention provides a method of assessing whether a site has characteristics that are suitable for use as, or is suitable for continued use as, a CCS site, a CCUS site, or both. Such analytical methods reflect new applications of rock volatile carbon dioxide.

In one aspect, the method comprises comparing the results of performing steps (a) and (b) of the method (separately) on samples obtained from at least two proximate sites from an area. In one aspect of such an embodiment of the method, the method further comprises validating that the rock composition of at least two of the at least two different sites are similar. Rock composition can be compared using a variety of methods known in the art, including methods described in the above-referenced '259 PCT application.

In one aspect, assessing the similarity of the rock composition comprises evaluating the mechanical strength of geologically equivalent samples. In one aspect, the mechanical strength of the rock samples obtained from potentially related proximate sites is assessed by applying force on at least two sides of the samples (e.g., top and bottom sides, right and left sides, or three or four sides). In a particular embodiment of such an inventive method, the method also or alternatively comprises crushing each sample in a volatiles-impervious crushable container (such as the devices described in the Smith patents, e.g., a container which can itself be crushed, can allow the sample within it to be crushed, yet maintains any volatiles released by crushing within the container until intentionally released, such as when punctured to release volatiles for analysis) and measuring the relative amount of crushing of the containers (such methods are sometimes described as "frackability" methods in the Smith patents). In some cases, the $CO_2$-containing rock volatiles also or alternatively are extracted from the container for analysis of carbon dioxide after the container is crushed. In one variation of the inventive method, the amount of crushing of the crushable containers, which is indicative of rock mechanical strength, is measured after the extraction of the volatiles.

In another variation of the facets/aspects/embodiments described above, the method also or alternatively comprises capturing the rock volatiles including rock volatile carbon dioxide in a cryogenic trap (e.g., a liquid nitrogen trap) and releasing the volatiles by heating the trap after a sufficient amount of contact of extracted volatiles with the trap has occurred. Such methods are described extensively in the Smith patents. In one aspect, the method further comprises measuring carbon dioxide in the released volatiles by mass spectrometry, as also described in the Smith patents. In an alternative aspect, the amount of carbon dioxide released from the rock volatiles is also or alternatively measured by any other appropriate analytical method, such as gas chromatography. However, in other aspects, the method lacks any chromatography analysis steps.

In still another variation of the methods discussed above, the method comprises comparing the carbon dioxide levels between different parts of a site (or "zones") to identify parts of a/the site (zones) that are more or less suitable for carbon sequestration (making it possible to develop a map of low, normal, or high carbon dioxide zones or suitable/unsuitable zones for retention of carbon dioxide). In aspects, a map can be a graphical representation of the geographical features of the area (e.g., site). In aspects, a graphical representation can be pictorial. In aspects, a graphical representation can be characterizable as topographical or stratigraphic in nature. In one aspect, the method comprises characterizing at least two zones, e.g., at least about 3, at least about 4, or at least about 5 zones or more, based on rock volatiles carbon dioxide content/characteristics. As discussed elsewhere herein and exemplified below, significant differences in the amount of rock volatiles carbon dioxide in different zones of a site can be indicative of zones that are capable or alternatively not capable of securely maintaining carbon dioxide. Such information can be used to locate potential CCS/CCUS zones within a site, or also or alternatively sites within a larger geological area, more precisely.

As mentioned above, the identification of zones within a site can be associated with any suitably distinct level or change in rock volatiles carbon dioxide content. In exemplary aspects of this variation of the invention, the method comprises identifying areas associated with an at least about 10%, at least about 20%, at least about 25%, or at least about 33%, such as, e.g., an about 10%-90%, e.g., about 15%-95%, about 15%-90%, about 20-90%, or about 20-80% decrease or increase in carbon dioxide in a region (zone) of at least about 300 feet, at least about 400 feet, at least about 500 feet, or more, in one or more directions, as compared to a second region of the site of at least about 300 feet, at least about 400 feet, at least about 500 feet, or more, in one or more directions.

In one aspect, the method further comprises factoring in real-world information about the site to the analysis (e.g., information about the location of faults, information about wells, information about changes in rock composition, and the like). For example, the method can comprise correlating a known or expected area of a fault with rock volatiles carbon dioxide levels. In aspects, rock volatiles carbon dioxide levels can be used to confirm the probability of the presence of a fault. In aspects, rock volatiles carbon dioxide levels can be used to identify leaks in a fault, with such faults indicating risk in selecting such faults for placement of a CCS/CCUS site. In aspects, identification of $CO_2$ levels can be used to assess, determine, or otherwise identify the likelihood, probability, or presence of a leak present in a fault. In aspects, the leak in the fault may be a leak through which a detectable, significant, or substantial amount of $CO_2$ has been lost in the past. In aspects, the identification of such a leak can be indicative of an increased risk of $CO_2$ escaping a fault, e.g., predicting loss of $CO_2$ in the future through such an identified leak in the fault. Real-world information, such as the presence of a fault, can also be combined with rock volatiles carbon dioxide information from a site, a proximate site, or both, to assess carbon dioxide loss from a site or an area, e.g., associated with such a geologic feature. In some cases, the real-world information is information associated with an event, examples of such aspects of the invention being also discussed elsewhere herein. According to certain embodiments, the methods herein alone can identify the presence of such a feature as a fault, and in aspects can identify such features when other analysis fails to do so, such as in cases where there is little or no variation in rock lithography and/or when sub-seismic faults exist.

In general, an aspect of these methods is directed to the assessment of changes in total rock volatiles carbon dioxide levels, the identification of differences in total rock volatiles carbon dioxide levels within zones of a site, the identification of changes in the total rock volatiles carbon dioxide levels, and the use of any or all thereof in planning the placement of CCS/CCUS sites, assessing the stability of a CCS/CCUS site, or in assessing carbon dioxide loss or potential loss impacts of activities. Another aspect of these methods is directed to the identification of one or more disruptive features within a geological location, e.g., a site such as a well or a potential CCS/CCUS site, such a disruptive feature being, e.g., a fault or nearby well, communication channel, or structural feature allowing for fluid loss/flow, wherein detectible changes in rock volatiles, other rock characteristics (e.g., permeability or mechanical strength), or both can be indicative of the presence of such a feature, and whereby such identification can aid in the assessment of CCS/CCUS site suitability. Although steps (a) and (b) in the methods of the Smith patents are similar to the methods provided herein, the applications of such methods to total rock volatiles carbon dioxide levels and feature (e.g., fault) identification, and the use of such information for assessing CCS/CCU site suitability-related matters, represent significant departures from the methods of the Smith patents. Accordingly, in aspects the methods can lack one or more elements of the Smith patents.

In one aspect, the method also or alternatively comprises reporting on carbon dioxide levels that are at least partially independent of oil/petroleum content, carbonate rock content, or both, in the site, area, or both. In one aspect, the method also or alternatively comprises no factoring of potentially competing or contaminating carbon dioxide sources. In another aspect, the method does not comprise any step to isolate the carbon dioxide content attributable to petroleum content in the site. While the Smith patents disclose the possible limited use of carbon dioxide rock volatiles to indicate the presence and quantity of petroleum products where potentially interfering sources of carbon dioxide could be minimized or factored out of the analysis, the present methods are generally focused on total rock volatile carbon dioxide levels, without regard to the amount of, or presence of, petroleum. Similarly, while the '259 PCT application focused on the use of such volatiles to indicate characteristics of carbonate rock composition (e.g., grain size), the methods described herein are focused generally on total rock volatiles carbon dioxide levels, regardless of the presence or absence of petroleum or carbonate rocks. In one aspect, the method of this invention does not comprise reporting on, relying on (in terms of the analytical results of the method), or performing an analysis of carbon monoxide or carbon monoxide-related compounds, such as described in the Smith patents, or the analysis of carbon dioxide-related compounds, as described in the '259 PCT application (e.g., CDRCs of the '259 PCT application).

In one such aspect, the method also or alternatively does not comprise reporting on the petroleum or oil content of the site. In one aspect, the method also or alternatively does not comprise reporting on carbonate rock content.

In one aspect, carbon dioxide rock volatile content is reported separately from any other rock volatile content in the performance of the method. In one aspect, no other rock volatiles are measured in the performance of the method. In one aspect, the output of performing the method does not comprise reporting on petroleum content, carbonate rock content, or both, in the site.

In further variations of the facets/aspects/embodiments described above, the amount of carbon dioxide measured in method(s) attributable to fluid inclusions is less than about 20%, less than about 10%, less than about 5%, less than about 2%, or less than about 1%. As described in the Smith patent, fluid inclusions are often not indicative of current conditions. As such, the inclusion of a significant amount of fluid inclusions may result in misleading data, and, accordingly, in certain aspects, the inclusion of fluid inclusions in the source of $CO_2$ is avoided.

In a further variation of the facet/aspects/embodiments described above or elsewhere herein, the method is performed upon the occurrence or discovery of an event, and the method is used to assess if the event has created a condition which has compromised the suitability of the site for use as a CCS site, CCUS site, or both. In one aspect, the method is used to assess the suitability of a CCUS site after the discovery of a condition or the occurrence of an event. For example, a condition such as a fault may be discovered at a site requiring evaluation or reevaluation by application of the method. Alternatively, an event can arise, such as a seismic event (an earthquake), disruption due to human activity (e.g., nearly fracking, construction, drilling, etc.), or the like, which could impact the suitability of the site, such as it could create a condition which compromises a/the seal of the site. In aspects, the method can be used to assess the suitability of the site for CCS/CCUS after the occurrence of the event. In such aspects, as well as in any of the other variation facets, aspects, embodiments, etc., the method can comprise obtaining samples from a part of the site that does not interrupt the integrity of a part of the site in which CCS or CCUS is planned, ongoing, or both. Thus, for example, such methods can include taking samples from a proximate site to a site of current or planned carbon dioxide storage to avoid disruption of the site and release of carbon dioxide to the atmosphere. In aspects, the proximate site is known to be, can be determined to be representative of the site of current or planned CCS or CCUS activity or is a site of current or planned CCS or CCUS activity. In aspects, sufficient information is known about the proximate site and its relationship to the site of current or planned $CO_2$ storage such that the results of the analysis of proximately collected samples can be used to assess current or planned CCS/CCUS site suitability.

In still another variation, the method comprises comparing the amount of rock volatiles $CO_2$ measured in step (b) of the method for some or all of the samples or some or all parts of a site (or sites or collections from different times, depending on the method), against a pre-developed standard (e.g., a standard developed to assess if the amount of carbon dioxide retained by a portion of the site is sufficient).

By application of the method to several sites, a knowledge base will be built up over time, and such knowledge can be used to generate such one or more standards that can be used in the method described in the preceding paragraph. For example, upon applying the method to at least 3, at least 5, at least 7, at least ten sites, at least 20 sites, etc., especially with similar rock properties, standards can be obtained for areas that have rock volatiles carbon dioxide properties that are indicative of favorable sites for CCUS/CCS applications. Such standards (or standards generated by any other suitable means) can be used for comparison to actual measurements. Even before the development of a standard, the methods of the invention can comprise comparison of results from different sites in an area, or even from different sites in different areas, but which have been determined to have similar characteristics based on, e.g., rock composition properties and other geologic properties known in the art.

In one embodiment, the invention described herein is a method of creating standard(s), comprises the development of standard(s), or results in the development of standard(s). In certain aspects, the invention is a method of creating a standard for use in assessing if the amount of carbon dioxide retained by a site or portion of a site is sufficient for CCS/CCUS activity comprising first collecting the results of a plurality of analyses described herein, followed by use those results to generate one or more scale(s) of relative suitability for site CCS/CCUS. In aspects, a scale can be generated using carbon dioxide data only, and in aspects only carbon dioxide data is needed in order to reference the scale to determine a particular site's suitability for CCS/CCUS activity. In other aspects, a scale can be generated using rock volatiles data, other rock characteristic(s) data such as permeability or mechanical strength, or the like, and accordingly such known data can be used to reference the scale to determine a particular site's suitability for CCS/CCUS activity. In aspects, a rock volatiles data can comprise ratios of a plurality of different rock volatiles analyses. In aspects, a scale can be generated using a plurality of, combination of, ratios of, or functions of rock volatiles data and other rock characteristic(s) data, including or excluding carbon dioxide, and, accordingly, such known or calculatable data can be used to reference the scale to determine a particular site's suitability for CCS/CCUS activity.

In aspects data from at least about 2, about 5, about 10, about 15, about 20, about 25, about 30, about 40, about 50, about 75, about 100, about 125, about 150, about 175, or about 200 or more sites are used to create such CCS/CCUS suitability scales.

In another facet, the invention provides a method that comprises performing steps (a) and (b) of the method on the samples and a second set of samples obtained from the site or a proximate site significantly before or after the collection of the samples. The difference in time can be any suitable period. In one example, the method comprises measuring the difference on an annual basis, a biannual basis, a semiannual basis. However, in other contexts, differences of at least ten years, at least 12 years, at least 15 years, or 20 or more years are envisioned, such as where there are old petroleum cuttings from the area that can be used for the analysis of the site or a proximate site.

In one application, methods of analyzing samples from the same site or proximate sites over time, as discussed in the preceding paragraph, are used to assess changes in the ability of the site to sequester/store carbon dioxide over time. For example, if there has been seismic activity in the area, the performance of such a method on samples from the area before the activity and after the activity can reveal information about how much carbon dioxide is contained in the area, which can indicate the ability of the area to maintain carbon dioxide, e.g., identify whether the seismic activity has modified the area's ability to sequester/store carbon dioxide. Loss of $CO_2$ via migration out of a volume of subterranean rock does not, however, necessarily require dependence on recent movement along a fault, or a fracture system, and any associated seismic activity; loss of $CO_2$ can simply be due to the movement of fluids in zones of enhanced permeability caused by past movement along a fault. A pressure increase in a reservoir related to petroleum migration into that reservoir can compromise the reservoir's seal and open fracture(s) between the reservoir and a nearby fault, thus allowing for $CO_2$ and other volatiles to escape along the fault-associated higher permeability zone, without any new seismic activity on the fault. Events or conditions that can cause changes over time can include, e.g., changes in pressure in a site (e.g., due to removal of material, such as removal of petroleum from the site, which may result in a rupture of a formation seal or barrier), changes in material, seismic events, developments of faults or other structural changes, or chemical changes in the composition of a material in the formation or site rocks.

In yet another facet, the invention provides a method of assessing changes in subterranean carbon dioxide over time in a site comprising (a) obtaining a sufficient number of geologic samples from the site at a first period; (b) measuring rock volatiles carbon dioxide level associated with the first period samples; (c) determining the carbon dioxide content of the site in the first period; (d) obtaining a sufficient number of geologic samples from the site, a proximate site, or both at a second period ("second period samples"); (e) measuring rock volatiles carbon dioxide level associated with the second period samples; (f) determining the carbon dioxide content of the site in the second period; and (g) comparing the difference in the carbon dioxide content in the site in the first and second periods to evaluate the change in carbon dioxide content of the site, area, or both between the first period and second period. In this respect, the invention provides means for assessing changes in carbon dioxide levels in subterranean environments, such as CCS and CCUS sites, over periods. Such methods can include measuring carbon dioxide rock volatile levels at about three or more times, four or more times, or about five or more times, in the same site, proximate sites, or both. The use of samples from a site proximate to a target site can be useful in not disrupting the ability of the target site to maintain carbon dioxide, which can be important in the context of CCUS and CCS sites. In aspects, the invention provides a method of assessing changes in subterranean carbon dioxide of a site over time comprising the above methods of (a) to (g), comprising the evaluation of hydrophobicity of the geologic samples obtained from at least two sites at two different periods, the method of evaluating the sufficient number of geologic samples obtained from at least two sites at two different periods, wherein, the hydrophobicity of the sample was evaluated for each period and the ratio response of at least two sites was determined to be similar. In aspects, the ratio response of at least two sites reveals that geologic samples from at least two sites obtained at two different periods share similar fluid history. In aspects, assessment of carbon dioxide from geologic samples obtained from at least two sites at different periods reveals no past evidence of carbon dioxide migration or loss can be evidence of a reduction in risk related to CCUS activities of a site. An evaluation of hydrophobicity can be performed using any one or more suitable methods, including methods described in the various references incorporated into this disclosure by reference or methods that are known to those of ordinary skill in the art.

Any of the above-described methods relating to the placement or ongoing or event-related assessment of CCUS/CCS sites can further comprise a step of sequestering carbon in the site, a proximate site, or both, using conventional CCS methods known in the art, or sequestering carbon in the site, a proximate site, or both, for use in a CCUS method, again using conventional methods known in the art.

Further, in any of the above-described methods relating to the placement or ongoing or event-related assessment of CCS/CCUS sites can comprise or further comprise the analysis of one or more non-$CO_2$ rock volatiles or rock characteristics such a permeability or mechanical strength, and such additional analysis can be used, in aspects alone, or in aspects in combination with, CO2 data to determine site suitability for carbon sequestration, such data for example in aspects being useful in the potential identification of a condition present at the site which can impact site suitability, such as, e.g., a fault.

In still a further facet, the invention provides a method of assessing the potential carbon dioxide release impact of a proposed subterranean operation/activity comprising performing steps (a) and (b) above on samples of a site, a proximate site, or both. In one aspect, the activity is a new drilling operation, such as drilling of a new petroleum well, an extension of a petroleum well, or drilling of another type of well for material extraction. In one aspect, steps (a) and (b) are performed on a proximate site (and ideally geologically related) to a proposed site of a new drilling operation to assess the potential loss of carbon dioxide from the site if the drilling were to be performed. Such information can then be relayed to regulators, owners, etc., and provide a measurement of the carbon dioxide impact of the newly proposed operation. In one aspect, the method comprises comparing the results to a standard or comparing the results to a predicted or actual measure of carbon dioxide loss from a site.

In still a further aspect, the invention provides a method of assessing the carbon dioxide release associated with subterranean activity comprising obtaining samples from the site of the subterranean activity and measuring carbon dioxide rock volatiles on such samples; and collecting and analyzing rock volatiles carbon dioxide from samples from a proximate site, to assess the actual release of carbon dioxide associated with the subterranean activity. In this respect, methods of the invention can be used to assess the carbon dioxide release impact of such operations (subterranean activity), which can inform policymakers, regulators, and producers of the impact of already performed activities. Where "carbon footprint" requirements are in place, such information can inform entities of the amount of carbon dioxide that will have to be sequestered or otherwise offset to make up for the $CO_2$ release associated with the activity.

In still a further facet, the invention provides a method of evaluating the degree of microbial degradation of oil in an oil deposit potentially exposed to microbial contamination comprising (a) identifying a site that is associated with a petroleum deposit where there is potential microbial contamination, (b) obtaining a sufficient number of geologic samples from the site or a geologically related site collected during a first, earlier, period and a sufficient number of geologic samples from the site collected during a second, more recent period; (c) measuring rock volatiles carbon dioxide level associated with the first period and second period samples; and (d) determining the carbon dioxide content of the site, to assess the degree of microbial degradation. In one aspect, such a method further comprises comparing the rock volatiles carbon dioxide measures from the area of potential microbial contamination to other areas of the site. Such methods can further comprise taking steps to stop microbial contamination of the petroleum (e.g., treating the oil with antimicrobial agents) or to reduce or stop the spread of such contamination in the area (e.g., sealing off parts of an area or site). In one facet, proximity, e.g., spatial relationships, between sites can be informative. In aspects, proximity or spatial relationships between sites can be informative independent of temporal relationships between the sites. In aspects, proximity of a first site showing evidence of biodegradation to a second site, e.g., but not limited to an earlier-drilled site, compared to the bio-degradation characteristics, or lack of bio-degradation indicators, of a third site further away from the second site than the first site, can demonstrate the impact of a site (e.g., the second site) on site CCS/CCUS suitability. In certain aspects, the distance between such first and third sites can be, e.g., about 50 feet, about 100 feet, about 150 feet, about 500 feet, about 1000 feet, about 1500 feet, about 2000 feet, about 2500 feet, about 3000 feet, about 3500 feet, about 4000 feet, about 4500 feet, about 5000 feet, or about 5500 feet, such as the two sites can be within about 0.25 miles, about 0.5 miles, about 0.75 miles, or e.g., about 1 mile from one another. In aspects, at least one zone of the first site can pass within, e.g., about 10 feet, about 25 feet, about 50 feet, about 100 feet, about 150 feet, about 200 feet, about 250 feet, about 300 feet, about 350 feet, about 400 feet, about 450 feet, about 500 feet, about 550 feet, about 600 feet, about 650 feet, about 700 feet, about 750 feet, about 800 feet, about 850 feet, about 900 feet, about 950 feet, or, e.g., about 1000 feet of the second site, such as between about 10-500 feet, about 50-500 feet, about 50-400 feet, about 100-500 feet, or about 200-about 500 feet of the second site. In aspects, demonstration of an impact of a second site on biodegradation of a first site can indicate that a communication channel exists (e.g., a communication channel capable of communicating air and microbes) between, e.g., and second site and a proximal first site. In aspects, a third site demonstrating a lack of impact on biodegradation from communication channels to the second site can confirm the second site's impact on the first. In aspects, the third site is demonstrated to be geologically related (e.g., comprising at least substantially the same composition) such that differences between rock volatiles analysis (e.g., specifically rock volatiles $CO_2$ analysis) between the first site and the third site can be attributed to the spatial relationships of the two sites relative to the second site. In aspects, identification of fluid communication characteristics, such as described elsewhere here can be a factor in determining/deeming site(s) unsuitable or less desirable/riskier for CCS/CCUS activity. In aspects, a more distant site lacking a detectable or significant bio-degradation impact from the second site may deem such a site more suitable for CCS/CCUS activity(ies). In aspects, such principles or any other principle/method, step, etc., of the various aspects of the invention described herein can be used as a component of a computerized device for automatically performing one or more analyses based on such methods. In this respect, the invention provides methods in which a computerized device (e.g., a computer, smartphone, tablet, etc.) comprising computer readable media that includes memory for receiving such analytical data and instructions for performing such analyses, along with processor(s) for executing such functions and reading such memory is employed. Specialized instructions relating to the type of data analyzed, type of analyses performed, and other elements of the method(s) are typical components of such computer-associated systems/methods. Various programming languages, systems, etc., known in the art can be employed in developing such computerized systems. In aspects, such computer systems perform such analyses automatically. In aspects, such computer systems include instructions for controlling one or more devices involved in performing steps of the method, including, e.g., extraction of volatiles, measurement of volatile compounds, consideration of other data points, plotting of data, analyzing patterns, and the like. Such computerized systems are also an aspect of the invention. Examples of such computerized systems can comprise smartphone applications, tablet applications, and the like. Such computerized systems can receive data from a site by wireless relay communication, and relay analytical results to devices associated with users of the computerized system or send machine control instructions to devices under control of the system. Computerized methods and systems typically comprise input and outputs, such as graphical user interface display outputs, control of devices, etc. In aspects, an output is a graphical representation or other abstraction representing a site and the various analytical outputs from the methods/steps, such as a graphical representation of zones of relatively higher risk for carbon dioxide lost, which can be determined by methods of the invention. Other, similar graphical or other abstraction outputs can be generated for other methods described herein, e.g., changes in mechanical strength identifying a fault or similar structure, changes in a site over time, etc.

In one aspect, the invention comprises performing carbon dioxide analysis of rock samples from a subterranean site that intersects a portion of the geographic area that contains one or more features that may interfere with the integrity of the site for carbon sequestration, such as one or more faults. In one facet, the invention comprises measuring active carbon dioxide changes, such as carbon dioxide loss from or additions to a portion of the geologic area, such as an area associated with a fault. The identification of such fault-associated zones of carbon dioxide loss or addition can be used to identify areas where carbon dioxide loss is likely, rendering the site unsuitable for carbon dioxide sequestration applications. In one aspect, the method is used to identify zones of different levels of carbon dioxide content around (e.g., near, adjacent to, on either side of, or any combination thereof) a subterranean feature, such as a fault, which can reflect the migration of carbon dioxide in the site. In one aspect, identification of changes in carbon dioxide content around such as a site, such as carbon dioxide loss or addition from part of a site, is used as a negative indicator for performing carbon dioxide sequestration activities in or around the site.

In this respect, the invention provides, in one aspect, a method of analyzing active (ongoing, current) loss of carbon dioxide in a subterranean site, such as a site that is a candidate for carbon dioxide sequestration. As reflected elsewhere in this disclosure, the invention also provides methods wherein the past loss or addition of carbon dioxide from a site is measured. In one aspect, both types of data are collected relating to a site or an area comprising one or more sites, and both such data are used in the analysis of the suitability of the site for carbon sequestration.

In aspects, the invention provided herein can be a method of determining whether a leakage of carbon dioxide is present in a fault, a method of assessing the risk of carbon dioxide leaking from a fault, or both. In one aspect, the invention comprises performing rock volatiles analysis, mechanical strength analysis, or both on rock samples for the assessment of risk of carbon dioxide leakage from a subterranean site that intersects a portion of the geographic area that contains one or more features that may interfere with the integrity of the site for carbon sequestration, such as one or more faults. In one facet, the invention comprises measuring changes in such data across the span represented by the samples collected, such as changes in one or more rock volatiles, changes in mechanical strength of samples, or both, whereby identifiable shifts, or changes, in data at a particular location across the span identifies the leakage of carbon dioxide in the associated with, or potentially associated with, a feature causing a compositional shift in the nature of the rock sampled, such as the presence of a fault. The identification of such carbon dioxide loss associated fault zone (s) can be used to assess whether the site or zone may be unsuitable for carbon dioxide sequestration applications. In one aspect, the method is used to identify zones of different levels of rock volatile(s) content, mechanical strength, or both, around (e.g., near, adjacent to, on either side of, or any combination thereof) a subterranean feature, such as a fault, which can reflect the migration of, or potential migration of, stored carbon dioxide out of the site. In one aspect, identification of changes in such content or characteristics of rock within a site, such as rock volatile loss, decreased mechanical strength of rock, or both, is used as a negative indicator for performing carbon dioxide sequestration activities in or around the site.

In one aspect, the inventive method is performed on samples from a site that is a former oil or gas field, or a different site comprising one or more reservoirs that have been demonstrated to be sealed in terms of one or more buoyant fluids, such as oil or gas. In one such aspect, the method is used to identify sites that are leaky with respect to carbon dioxide, such as in a site that has been at least somewhat effectively sealed with respect to other buoyant fluids. According to certain aspects of the invention, the inventive method can be used to determine whether such a site remains effectively sealed or whether some condition has changed in or about the site such that, e.g., such a seal has been compromised/broken, and carbon dioxide in the site is now being allowed to leak/escape. In aspects, the methods herein can be applied to identifying the shift of a potential or current CCS/CCUS activity site from suitable to unsuitable. In aspects, methods herein can indicate when action should be taken to address sites currently serving as carbon dioxide storage/sequestration site(s), but which indicate leaking is occurring, such action aimed at reducing or stopping such leaking or, e.g., transferring stored/sequestered $CO_2$ to a more suitable location.

In one aspect, archived petroleum drill cuttings are used in part of the analysis for a site, area, or region. In one aspect, new cuttings also or alternatively are used, which can be sealed at the site cuttings or unsealed cuttings, such as washed and dried petroleum cuttings. Also or alternatively, other types of samples, such as core samples, can be used in the analytical method. In one facet, the data from the various methods of the invention are considered in evaluating whether to use a site as a carbon sequestration site, whether to continue to use a site currently operating as a carbon sequestration site, or whether to expand a site or increase the use of a site for CCS/CCUS endeavors.

In one aspect, carbon dioxide rock volatiles data is analyzed in combination with associated gamma-ray log data. Gamma-ray data is known to indicate different zones of a formation in terms of rock content. For example, higher shale or clay content is often associated with higher gamma-ray readings in a site. Gamma-ray data, or new spikes or changes to values in gamma-ray readings compared to related, previous gamma-ray readings can, accordingly, be indicative of the presence of a fault. As such, by using both gamma-ray data and, e.g., carbon dioxide rock volatiles data, that is, combining or overlaying such data from the same geological location, scientists can assess changes in carbon dioxide content in a formation in areas that are likely to contain a fault, providing further indication that the site is unsuitable for carbon sequestration activities. The method can also or alternatively comprise the use of any other suitable method for locating a possible fault or other subterranean feature in association with the carbon dioxide rock volatiles data for that location, associated locations, and surrounding locations in a formation or region. Such data can, in some cases, be new data or such data can be obtained from drawing on previously established site geology information and also or alternatively can include rock volatiles data on species other than carbon dioxide (such methods are described in my other patent applications and patents but are further elucidated here as it applies to the identification of features which may identify a site as more or less suitable for CCS/CCUS activity(ies)).

In one aspect, the method comprises analyzing other rock volatiles, such as one or more of methane, ethane, propane, butane, one or more $C_5$-$C_{10}$ paraffin(s), one or more $C_6$-$C_{10}$ naphthene(s), or one or more $C_6$-$C_8$ aromatic(s), or any combination thereof from the samples. According to certain embodiments, changes in one or more of such other rock volatiles content is (are) indicative of gas loss from, or additions of gas to, an associated part of the formation. In some specific aspects, such other rock volatiles comprise, primarily comprise, generally consist of, or consist of methane. In certain aspects, the other rock volatile(s) analyzed, typically in addition to carbon dioxide, in assessing the loss of fluids from the site and thus suitability for sequestration of fluids, such as carbon dioxide, comprises, primarily comprises, generally consists of, substantially consists of, or is, methane. In some aspects, other volatiles may be detected, but it is the carbon dioxide rock volatiles measurement, the methane rock volatiles measurement, or a combination thereof that is primarily or exclusively used to assess the suitability of the site for carbon sequestration activities.

In one aspect, the measurement of such one or more rock volatiles (e.g., methane rock volatiles) content and carbon dioxide rock volatiles content, or either thereof, is associated with the expected presence of a subterranean feature, such as a fault. In one aspect, a change in the content of one or more rock volatiles within a specific location of a site is indicative of a feature of the site causing gas movement or migration patterns that are different from other areas of a site. For example, in one aspect, the identification of a zone of relatively low methane content is indicative of the loss of natural gas from a part of a site, which may indicate carbon dioxide migration in the site. In some aspects, such a low methane content is interpreted to be due to a sweeping, or replacement of, the methane gas by something else, e.g., another gas, such as carbon dioxide as it migrates from one location to another via a formation feature, such as a fault. In some aspects, such a gas may not be methane but may be one of any other one or more rock volatiles described previously or a ratio of any such one or more rock volatiles previously described. In one aspect, the method comprises identifying areas of relatively high or relatively low carbon dioxide rock volatiles and areas of relatively high or low other rock volatile (e.g., methane, ethane, butanes, or pentanes) content, where areas of significant changes in either or both measurements reflect a lower likelihood of suitability of a site for carbon sequestration activities. In some aspects, a defined area of a well wherein a co-analyzed one or more other rock volatile(s) (e.g., methane rock volatiles) drop, and the carbon dioxide rock volatiles rise, compared to their values near (e.g., relatively adjacent to) the defined area is indicative of a geological feature within the site, e.g., a fault, that is allowing for the other rock volatile, e.g., methane, to be replaced by carbon dioxide, indicating carbon dioxide flow and hence can be representative of a site wherein carbon dioxide cannot be effectively sequestered.

In certain aspects, other non-rock volatile data can be useful in assessing site suitability for CCS/CCUS activity (ies). For example, in aspects, characteristics such as rock permeability and rock mechanical strength can be utilized to determine, or utilized to support the determination of, site suitability.

According to some aspects, samples representative of a span of a site can be collected and such samples analyzed for permeability. In certain aspects, identifiable shift(s) in rock permeability at specific location(s) across the span of measured samples can indicate the presence of a feature which may render the site less suitable for CCS/CCUS activity, such as, e.g., the presence of a fault. According to some aspects, samples representative of a span of a site considered for CCS/CCUS activity can be analyzed for mechanical strength. In aspects, identifiable shift(s), change(s), or pattern(s) in rock mechanical strength at specific location(s) across the span of measure samples can indicate the presence of a feature which may render the site less suitable for CCS/CCUS activity, such as, e.g., the presence of a fault. In aspects, mechanical strength of rock can be lower when in close proximity to a fault, and alternatively be higher when located further away from a fault. In aspects, identifying a pattern of decreasing mechanical strength to a nadir at a particular location within a span of analyzed rock, then increasing mechanical strength of rock as the distance of the rock from the location increases, can be indicative of the presence of a fault. In aspects, such permeability data, mechanical strength data, or both can be combined with rock volatile(s) data, rock volatile carbon dioxide data, gamma-ray log data, or any combination thereof to support or confirm the identification of the presence of a feature such as a fault, or to support/confirm the likely presence of a feature such as a fault within the span of a site represented by the analyzed samples.

In one aspect, the analysis of the suitability of a site for carbon sequestration can be performed independently of any other analysis. In another aspect, the analysis of the suitability of a site for carbon sequestration can be performed in conjunction with, e.g., at the same time as or as part of the same analysis of the suitability of the site for other purposes, such as oil or gas exploration.

In one aspect of the invention, as previously described, indications of prior loss or gains of carbon dioxide from a site as determined by carbon dioxide rock volatiles analysis can indicate that a site is suboptimal for carbon sequestration. In another aspect of the invention, indications of no prior loss or gain of carbon dioxide from a site as determined by carbon dioxide rock volatiles analysis can indicate, or aid in indicating, that a site may be appropriate for carbon sequestration. In one aspect of the invention, data obtained from the monitoring of carbon dioxide loss or gain by application of rock volatiles carbon dioxide analysis or other means of detection of carbon dioxide loss or gas loss from or gain in an active carbon sequestration site is analyzed in combination with, and in some aspects compared to, prior carbon dioxide data, either indicating loss or maintenance of carbon dioxide from or within the site obtained through carbon dioxide rock volatiles analysis, as described and exemplified herein. In one aspect, a change from prior carbon dioxide rock volatiles data from the site indicating no or limited loss of or addition of carbon dioxide to the site, an indication of ongoing carbon dioxide loss or gain in a now active sequestration site determined by the methods of the invention, or indications of both events, indicates that the site should be repaired, conditions of storage/use changed, or use of the site discontinued.

EXEMPLARY APPLICATIONS

To further exemplify and illuminate aspects of the invention, the following description of illustrative applications of particular aspects of the invention is provided. These "Examples" are meant to exemplify particular facets of the invention but should not be used to limit the scope of the invention in any manner.

Example 1

This example demonstrates how the use of carbon dioxide rock volatiles from two sites in an area can be used in a comparative method to identify zones in a site/area of relative carbon dioxide loss, which can be used to inform CCS/CCUS operations.

Two closely located horizontal oil wells were drilled in 2019. The trajectory of the two wells was parallel and held to be as identical as possible from about 12,000 feet measured depth until total depth (TD). The two parallel wells were drilled about 0.75 miles from each other. Drill cuttings were obtained from each well for a variety of depths, reflected on the left axis of FIG. 1, and the cuttings subjected to rock volatiles analysis using the methods described in the Smith patents, including gentle vacuum volatiles extraction, cryogenic capture of volatiles, warming release of trapped volatiles, and mass spectrometry quantitative analysis of the trap-released volatile compounds, in this case with a focus on carbon dioxide. The results of the analysis were plotted in FIG. 1 (the Y-axis (left) reflecting the depth of cuttings samples and the X-axis (top) reflecting relative quantity by mass spectrometry count units for carbon dioxide volatiles).

From about 12,000 feet to 16,000 feet, the $CO_2$ tracks of the cuttings analyzed from each well are remarkably similar, which is reflected by the indicator "Zone A." However, below 16,000 feet, the rock volatile $CO_2$ contents from the two wells diverge, the well associated with the line comprising open-square indicators (well 1) showing mostly lower $CO_2$ than the well associated with the filled-square data (well 2) line (reflected by the indicator "Zone B").

Around 18,000 feet, there is a visible spike or nose of higher rock volatile $CO_2$ contents in the well 1 (open-square) data. At this measured depth, well 1 traversed within 400 feet of a circa 1995 vertical oil well that produced oil from the same reservoir drilled again by the 2019-drilled wells 1 and 2.

The production of oil and gas reduces the pressure in a reservoir. The dissolved $CO_2$ in the water and $CO_2$ dissolved in oil in the reservoir, present as molecular carbon dioxide in water as well as carbon dioxide formed from the dissociation of carbonic acid and bicarbonate also dissolved in the formation water, was released as a result of this pressure reduction. Thus, our present-day analyses of the cuttings from well 1 (2019 well, open-square indicators) show that at measured depths greater than 16,000 feet, $CO_2$ has been lost from the subsurface reservoir and produced to the Earth's surface along with the oil and gas produced by the circa 1995 vertical well.

The second "nose" of high $CO_2$ measured at around 18,000 feet in the 2019 well was caused by biodegradation of oil near the circa 1995 vertical oil well. Carbon dioxide is one of several biodegradation products of oil in the subsurface. Biodegradation occurred at this depth because the circa 1995 vertical well introduced air and microbes into the subsurface at this location, as well as producing oil and gas.

The mechanical strength of the cuttings from both well 1 and well 2 (described in FIG. 1) were also measured using the frackability methods described in the Smith patents. These results are plotted in FIG. 2. Unlike the carbon dioxide data in FIG. 1 for the two wells, the mechanical strength data reflects, as expected given the proximity of the wells, that the rock properties of the two wells are very similar, such that variations in rock volatiles carbon dioxide levels between the two sites are attributable to features of the site (e.g., the existence of the wells), rather than to inherent rock property differences.

These data demonstrate that cuttings from a younger, more recently drilled well can be used to evaluate if a close-by (proximate) older well has caused $CO_2$ drainage from the subsurface reservoir and can be used to estimate the size of the aerial extent of this effect. In well 1 as exemplified, the effect becomes observable starting at about a measured depth of 16,000 feet, and the closest proximity of the wells was at 18,000 feet. This data indicates a $CO_2$ loss radius of at least 2,000 feet from the circa 1995 vertical well. The actual carbon dioxide drainage radius is expected to be somewhat larger than 2,000 feet as the circa 1995 vertical well was drilled about 400 feet off the trajectory of the 2019 well 1 horizontal well. Well 2, located more distant from the circa 1995 vertical well, escapes the impact of the earlier drilled well and maintains potential suitability as a CCS/CCUS site.

This example further illustrates how proximity, e.g., spatial relationships, between sites can be informative. Proximity of a site showing biodegradation to, e.g., an earlier-drilled site, compared to a site further away from the earlier-drilled site which does not demonstrate biodegradation, can demonstrate the impact of an earlier-drilled site on site CCS/CCUS suitability. Demonstration of an impact on biodegradation can indicate that a communication channel exists (e.g., a communication channel capable of communicating air and microbes) between, e.g., an earlier site and a proximal, more recent site. Such a communication can deem site(s) unsuitable for CCS/CCUS activity. Alternatively, because, in this Example, the more distant, recently drilled site does not demonstrate biodegradation, it appears that the earlier-drilled site does not have a communication channel to that site (air and microbes have not been able to migrate to that site to cause biodegradation), the more distant site may maintain suitability for CCS/CCUS activity (ies).

The size of the area of $CO_2$ loss is critical knowledge for carbon capture and sequestration (CCS), as it is an indication of how close the CCS reservoir can be, in some cases, to pre-existing wells, and indicates the limits that must be placed on new drilling in and near an area of $CO_2$ sequestration. Thus, this example reflects that cuttings from previously drilled wells, or $CO_2$ loss assessment wells, can be used to determine whether nearby wells, faults, and similar structural disruptions/elements pose a threat to possible loss of $CO_2$ if sequestered in those reservoirs.

Example 2

Figure 2:
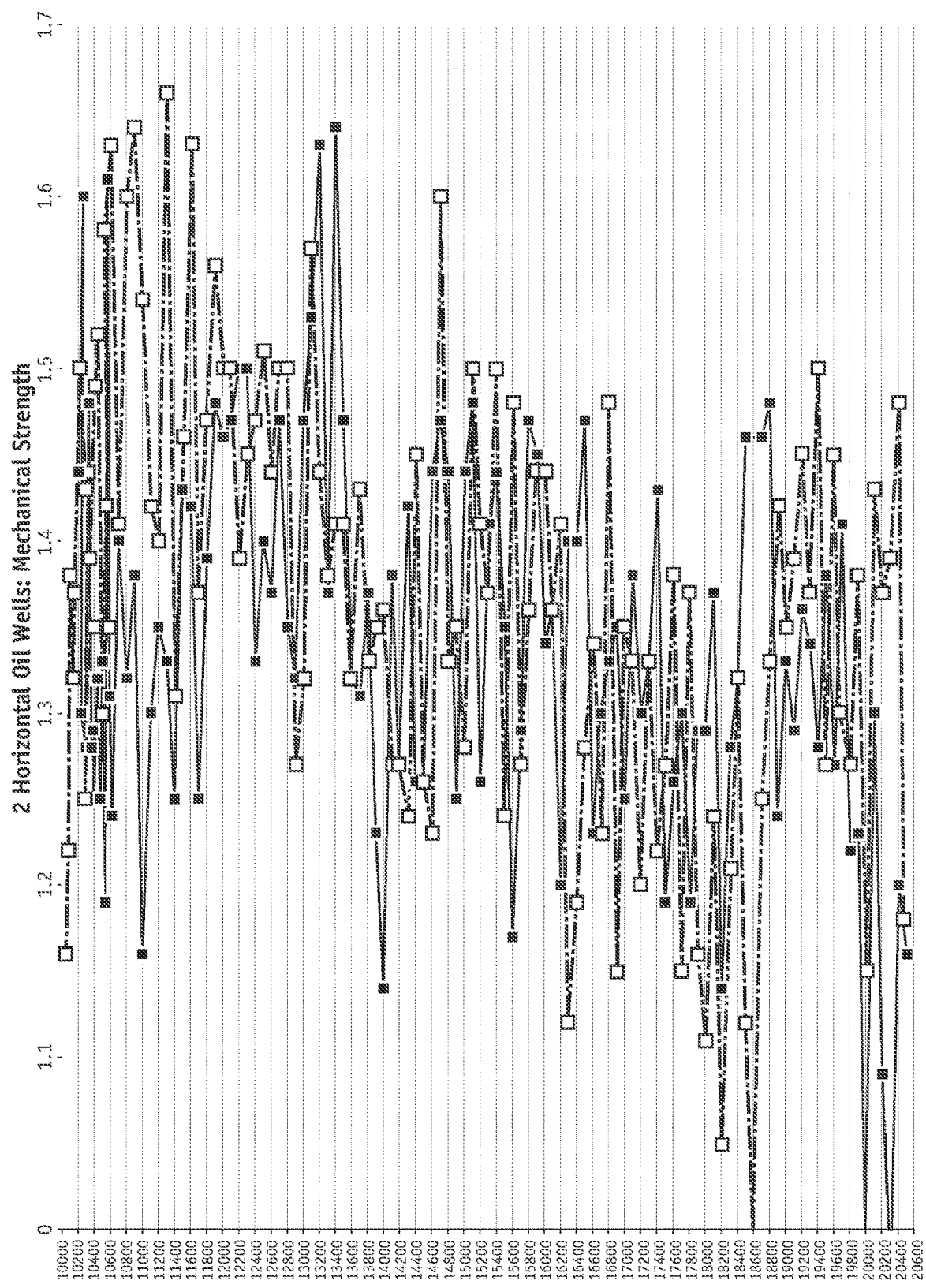

In this example, petroleum drill cuttings were obtained from a horizontal petroleum drill site located in a different region from wells exemplified in FIG. 1, and the cuttings were subjected to rock volatiles carbon dioxide analysis using the methods described in the Smith patents. The results from this analysis were plotted in FIG. 3, in a manner similar to the results shown in FIG. 1. Distances on the Y-axis range from 11,000 to 15,400 feet, with increments of 200 feet.

Figure 3:
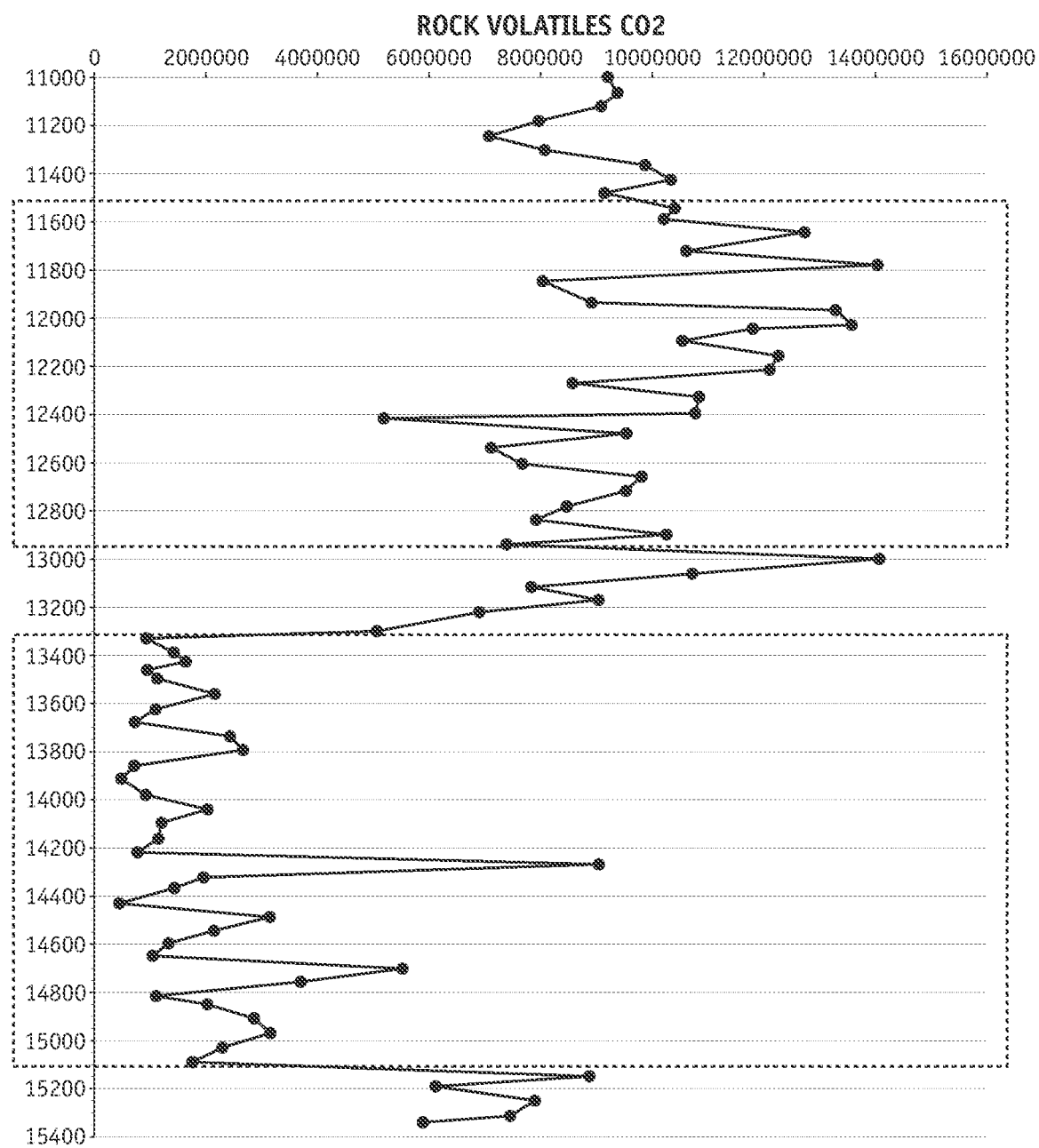
Figure 4:
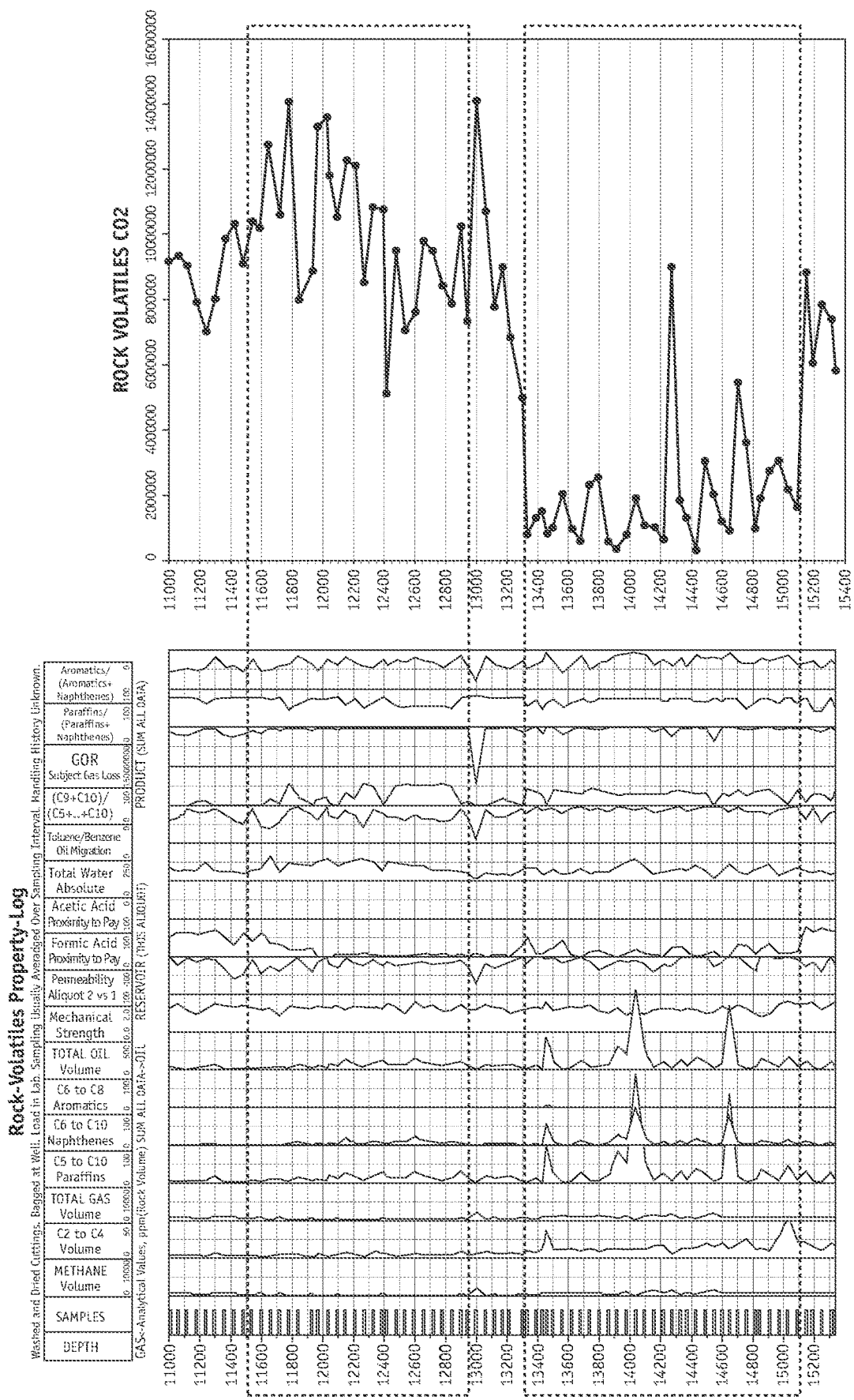

The distal part of this well plot shows a clear rock volatiles $CO_2$ depletion (FIG. 3, lower dashed box). The associated rock volatiles log indicates this section of the well has lost its oil and gas (FIG. 4). The upper section of the graph (more shallow depths) with higher $CO_2$ (indicated in FIG. 3 as the upper dashed box) has maintained its oil and gas in the reservoir. There are no nearby wells that could have caused the loss of the $CO_2$ and oil and gas from the lower reservoir. However, the lower part of the reservoir shown in FIG. 3 comes very close to a major fault. FIG. 4 provides the graph of FIG. 3 adjacent to the rock volatiles log from this same well. From the results of this data, we can see that this fault served as a natural conduit for $CO_2$, as well as oil and gas, loss from this reservoir. It is possible that the increased pressure in this reservoir promoted the opening of fracture between the reservoir and the nearby major fault, thus causing the loss of the $CO_2$ as well as oil and gas. The $CO_2$ was lost from the water and from oil in the formation as the pressure dropped as a result of seal failure in the lower part of the reservoir. Thus, these results demonstrate how the method can be used to detect how $CO_2$ was lost from a subsurface reservoir as a result of proximity to a major fault, and how the method of the invention can be combined with real-world data to assess the risk of carbon dioxide loss from a site, which is important in evaluating the potential suitability of a site for CCS/CCUS applications.

Example 3

The '259 PCT publication, and related '194 application, both previously referenced, disclose how carbon dioxide amounts analyzed from, e.g., limestone formations can be used to monitor the grain sizes of mineral carbonates drilled at various locations in a horizontal borehole.

Figure 5:
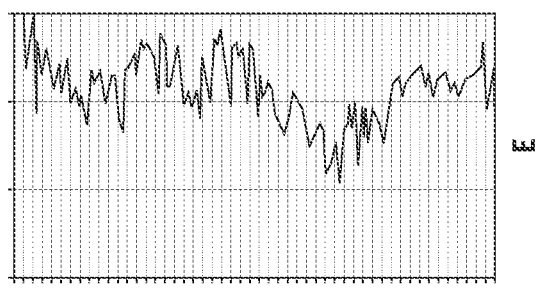
Figure 5:
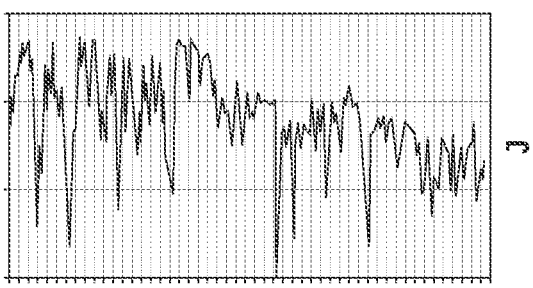
Figure 5:
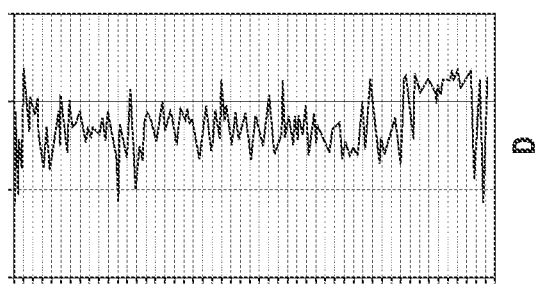
Figure 5:
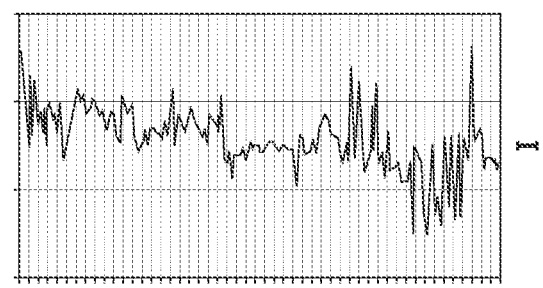
Figure 5:
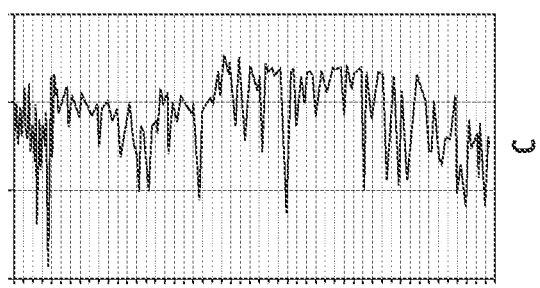
Figure 5:
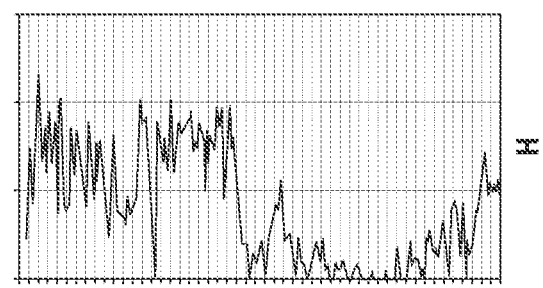
Figure 5:
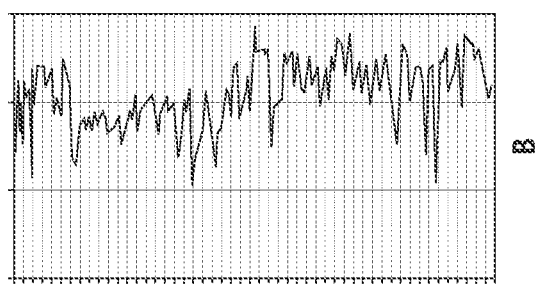
Figure 5:
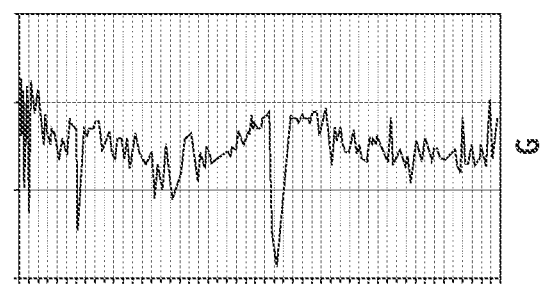
Figure 5:
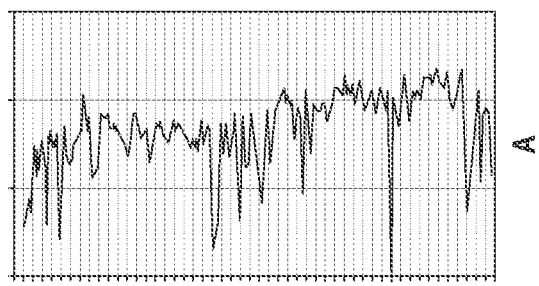
Figure 5:
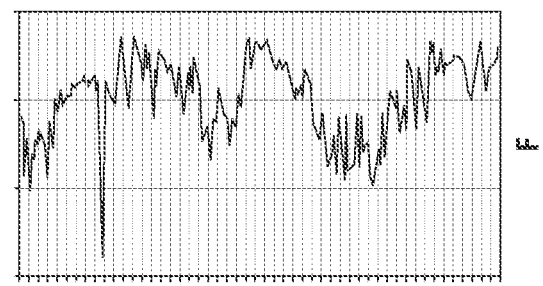

FIG. 5 shows the $CO_2$ track of ten wells (labeled A-J) drilled in two adjacent counties in Oklahoma, all through the same part of the same limestone formation. The $CO_2$ scale (x-axis) on all plots is the same, though not illustrated for the sake of simplicity, as it is the relative patterns of the graphs is what is of importance in this Example. The scales for each graph are logarithmic scales that start from 100,000 on the left of each graph to 100,000,000 on the right of each graph. These values are digitized mass spectrometer responses for $CO_2$ for all ten wells.

Figure 6:
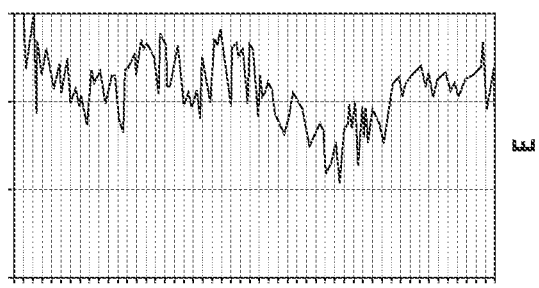
FIG. 6 is the same collection of graphs as FIG. 5, except that the graph for well H is circled, as the carbon dioxide rock volatiles levels reflect differences of 2-3 orders of magnitude greater than the variance in carbon dioxide levels in the other nine graphs from the collection of wells.
Figure 6:
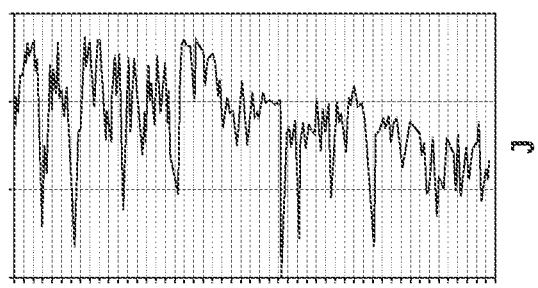
Figure 6:
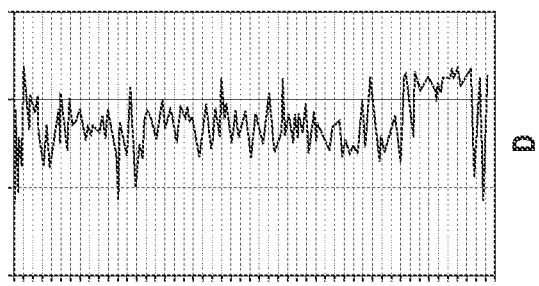
Figure 6:
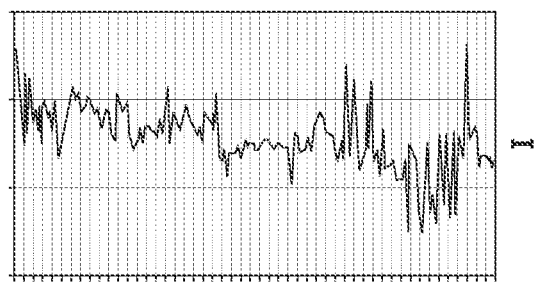
Figure 6:
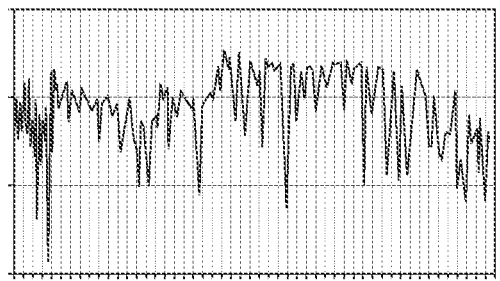
Figure 6:
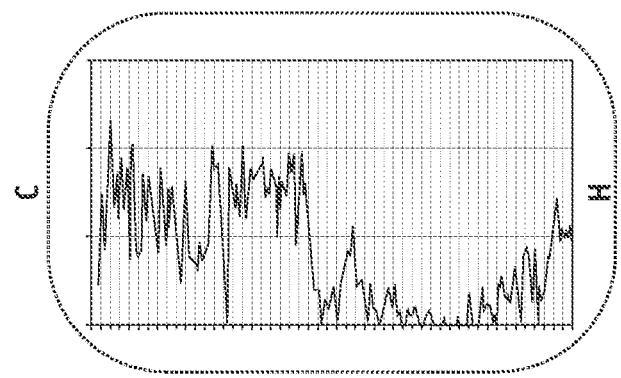
Figure 6:
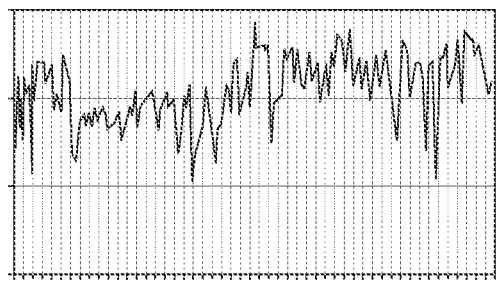
Figure 6:
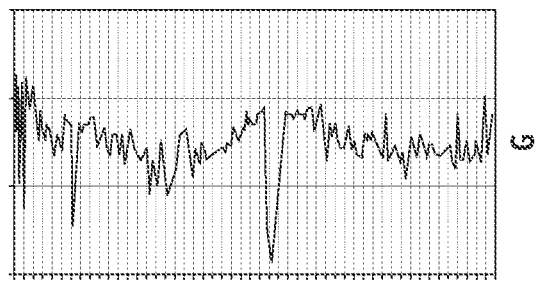
Figure 6:
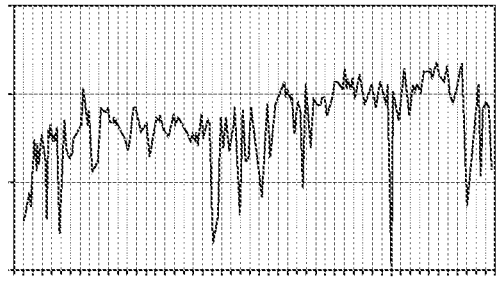
Figure 6:
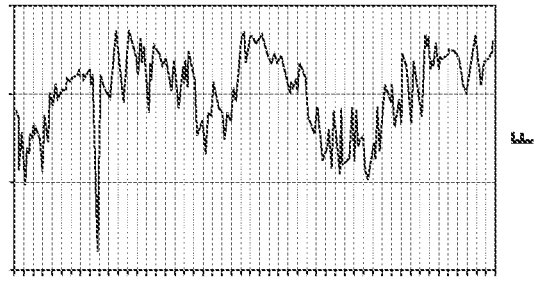

The second figure in this Example (FIG. 6) is essentially the same as FIG. 5, except that one well, Well H, has been circled. Almost half of this horizontal borehole, Well H, has $CO_2$ values that are 1 to 2 orders of magnitude lower than those seen in the other nine wells. $CO_2$ values in this well are generally lower than most of the values in the other nine wells. The variations seen in the other nine wells are the variations in $CO_2$ related to the changes in grain sizes discussed in the above-referenced '259 application.

The extremely low carbon dioxide in the circled well, well H, occurs in a zone where this well crossed a major fault. The loss of $CO_2$ associated with the fault in this well is quite distinct in magnitude and total $CO_2$ volume than the variation of $CO_2$ seen from grain size variation in the other horizontal wells drilled in the same part of the same limestone formation in an area representing two adjacent counties.

This Example shows that the carbon dioxide distribution in the subsurface can be used for multiple applications. The nine wells reflected by data outside the circled graph (wells A-G and I-J) are amenable for the use of $CO_2$ as a tool to map variations in carbonate mineral grain size (per the '259 application). The circled well, however, is an example of $CO_2$ loss from the site through migration out of the site along a fault.

The implication for CCS is that CCS should not be attempted in this site (well H), and probably not in sites within a reasonable proximity of the location of well H. Well H's $CO_2$ contents attest to past loss of $CO_2$ associated with the large fault the well penetrated. The other nine wells do not show this great fault-associated loss in CO2, and therefore from at least this risk assessment can still be considered as CCS candidates.

Example 4

Figure 7:
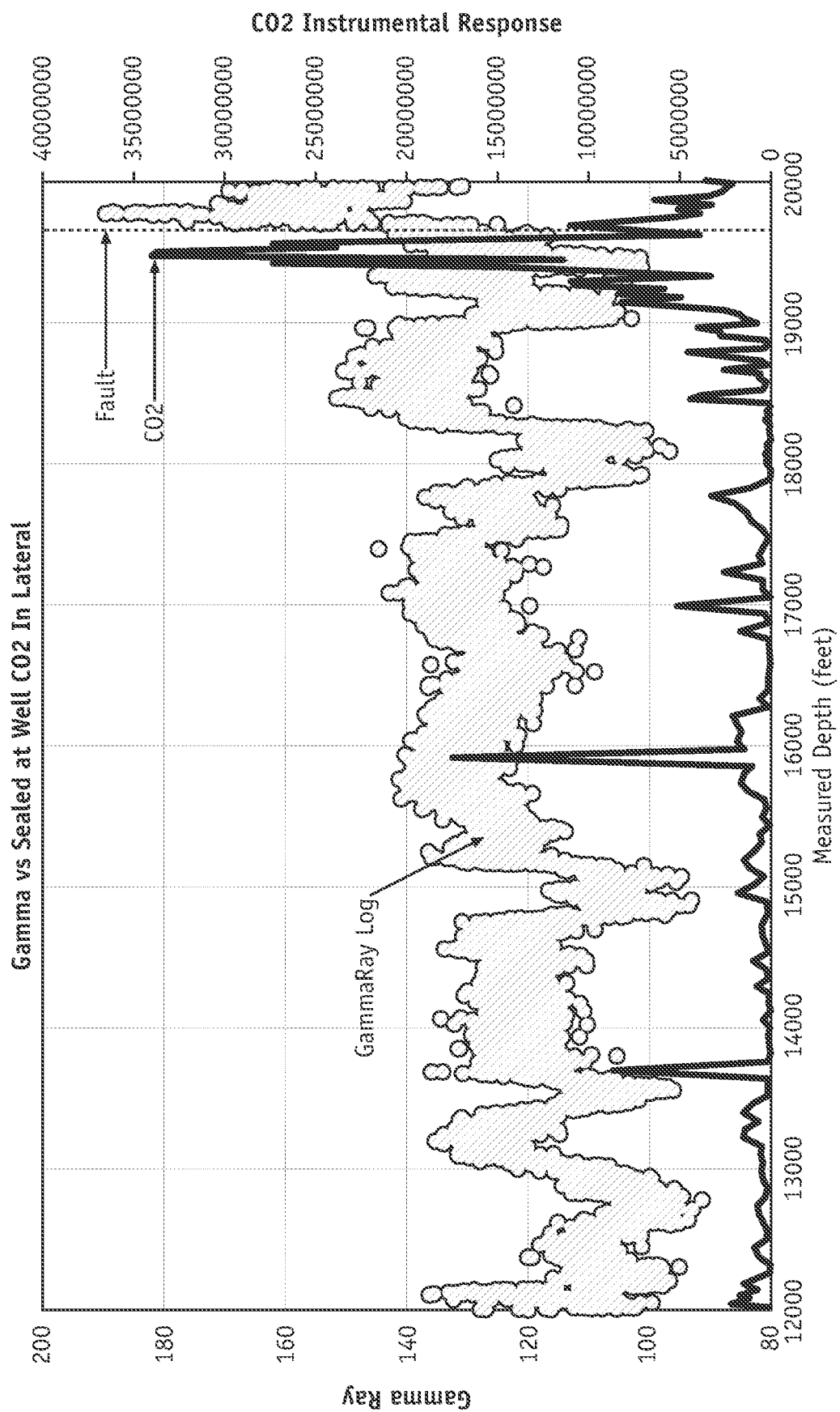
FIG. 7 is a graph of a gamma-ray log and carbon dioxide measurements obtained by performing gamma-ray and analysis and an analytical method of the invention on drill cuttings obtained from a vertical well that intersects a fault.

In this Example, sealed at the well petroleum drill cuttings data were obtained from a 2-mile long high-temperature horizontal gas well, and subjected to carbon dioxide and methane rock volatiles analysis using methods described above. Gamma-ray measurements were obtained along the length of the well. This gamma-ray data indicates that the gas well crosses a fault near its termination, otherwise known as the well's toe. The gamma-ray data and carbon dioxide rock volatiles data were co-analyzed (e.g., overlaid) graphically, as shown in FIG. 7. $CO_2$ data is shown by the solid black line. Gamma-ray data is shown as a "cloud" of data points as data point indicators slightly overlap one another. This overlap does not interfere with the exemplification of the concepts herein.

The highest carbon dioxide detected in the performance of the analysis, and the lowest levels of methane detected in the performance of the analysis, in the well are documented as being adjacent to the fault (see the right-hand side of FIG. 7) (methane data not shown). Using this data, one can reasonably expect that carbon dioxide is generated in a deeper formation below the strata that this well penetrates and migrates up the fault. This reflects an aspect of the invention that is different from the aspects exemplified in Examples 1-3, where low carbon dioxide rock volatiles values reflected prior loss of carbon dioxide from the site. In contrast, anomalously high carbon dioxide rock volatiles near the fault detected here reflects ongoing movement of carbon dioxide in the site. Specifically, this gas reservoir is actively migrating carbon dioxide into and out of the reservoir along this fault. Clearly this is an indication that this reservoir, especially near this fault, and the deeper reservoir, which is generating the carbon dioxide, are not suitable for permanent $CO_2$ sequestration.

This fault-associated zone is also the zone of lowest methane in the well (methane data not shown in FIG. 7), an indication that the carbon dioxide-rich gas migrating along the fault is sweeping the previously present natural gas (e.g., methane) out of the reservoir as the carbon dioxide migrates through. Thus, the combined use of the carbon dioxide rock volatiles data, data about the feature of the site (here, a fault identified through gamma-ray data), and rock volatiles methane data, provide data that can help characterize the site and help evaluate the suitability of the site for carbon sequestration.

Figure 8:
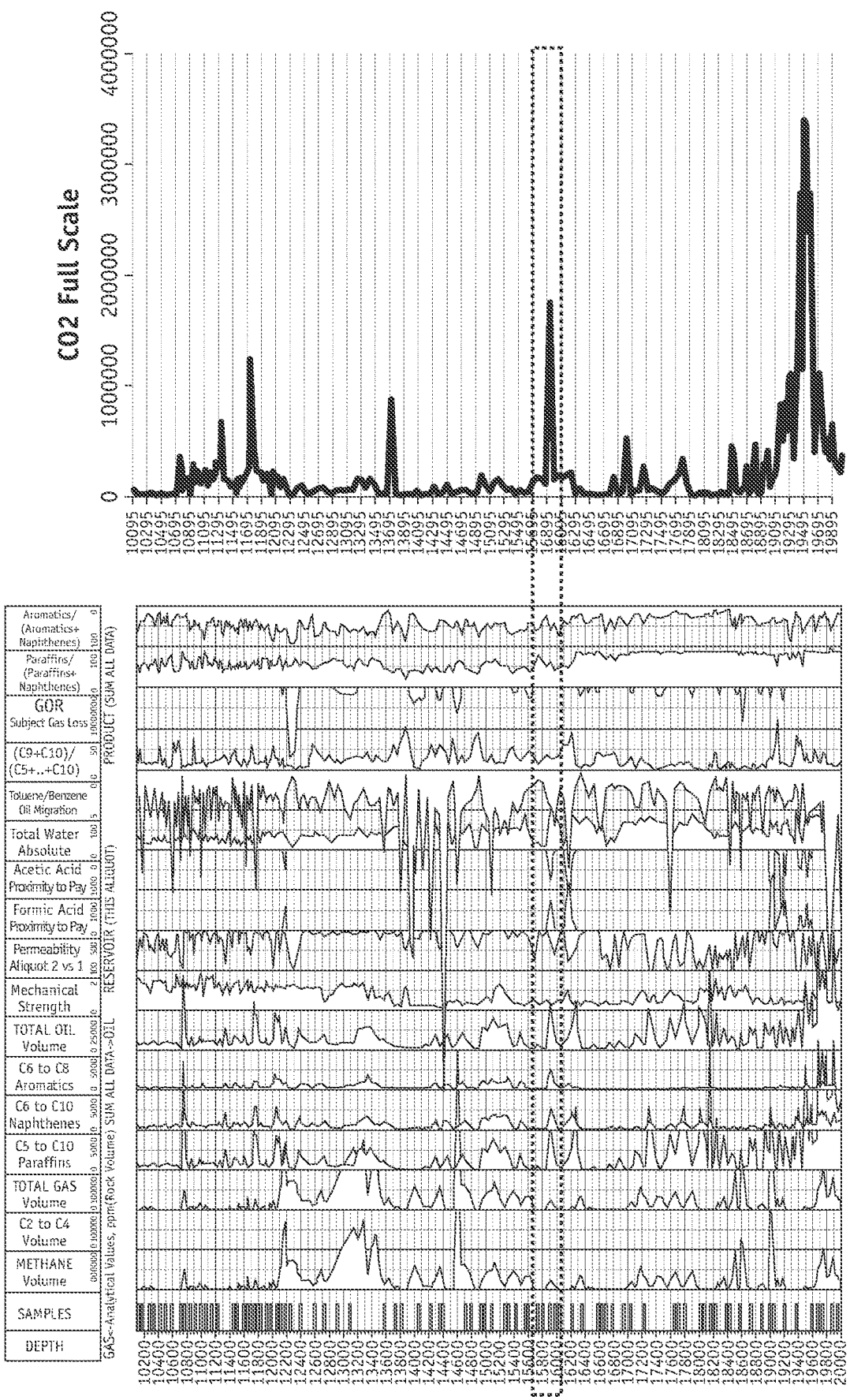
FIG. 8 is a graph of rock volatiles measurements, including methane measurements obtained by performing rock volatiles analysis methods that are the subject of my prior patent applications and patents on samples from the same vertical well intersecting a fault shown in FIG. 7.

Other rock volatiles were extracted from the samples, including methane, as discussed above, and analyzed and the data collected and recorded in a volatiles measurement log (shown along with the rock volatiles carbon dioxide data as FIG. 8). The area of self-sourced carbon dioxide expected to be associated with the fault is reflected in the indicator band (represented by a dashed box) running across the volatiles log (at around 15800 to 16000 ft). This data reflects the relatively low amount of methane and a relatively high amount of carbon dioxide associated with the fault area as well as distinct levels of each compound in different parts of the well, as discussed above. Such a combined/comparative analysis provides a tool for extracting insights about what is happening to other rock volatiles at the location within the well where the carbon dioxide content changes, e.g., increases.

This data also demonstrates that the methods described herein can be used to document carbon dioxide actively migrating out of a reservoir, which along with or alternatively to data reflecting a prior loss of carbon dioxide from a reservoir, as exemplified in the preceding Examples, is indicative that a site is not suitable for carbon sequestration. Similar methods can be used on different types of sites, with different types of rock samples, to aid in the evaluation of geologic formations for carbon sequestration.

Example 5

In this Example, the application of rock volatile stratigraphy and mechanical strength analysis to the identification of fault(s) is exemplified.

Figure 9:
FIG. 9 is a graph of rock volatiles data collected on samples representing the span of a lateral well, wherein the levels of select analytes within, and select characteristics of, samples representative of the span of the well demonstrate a shift at a distinct location within the well, indicating the possible presence of a disruptive feature such as a fault.
Figure 10:
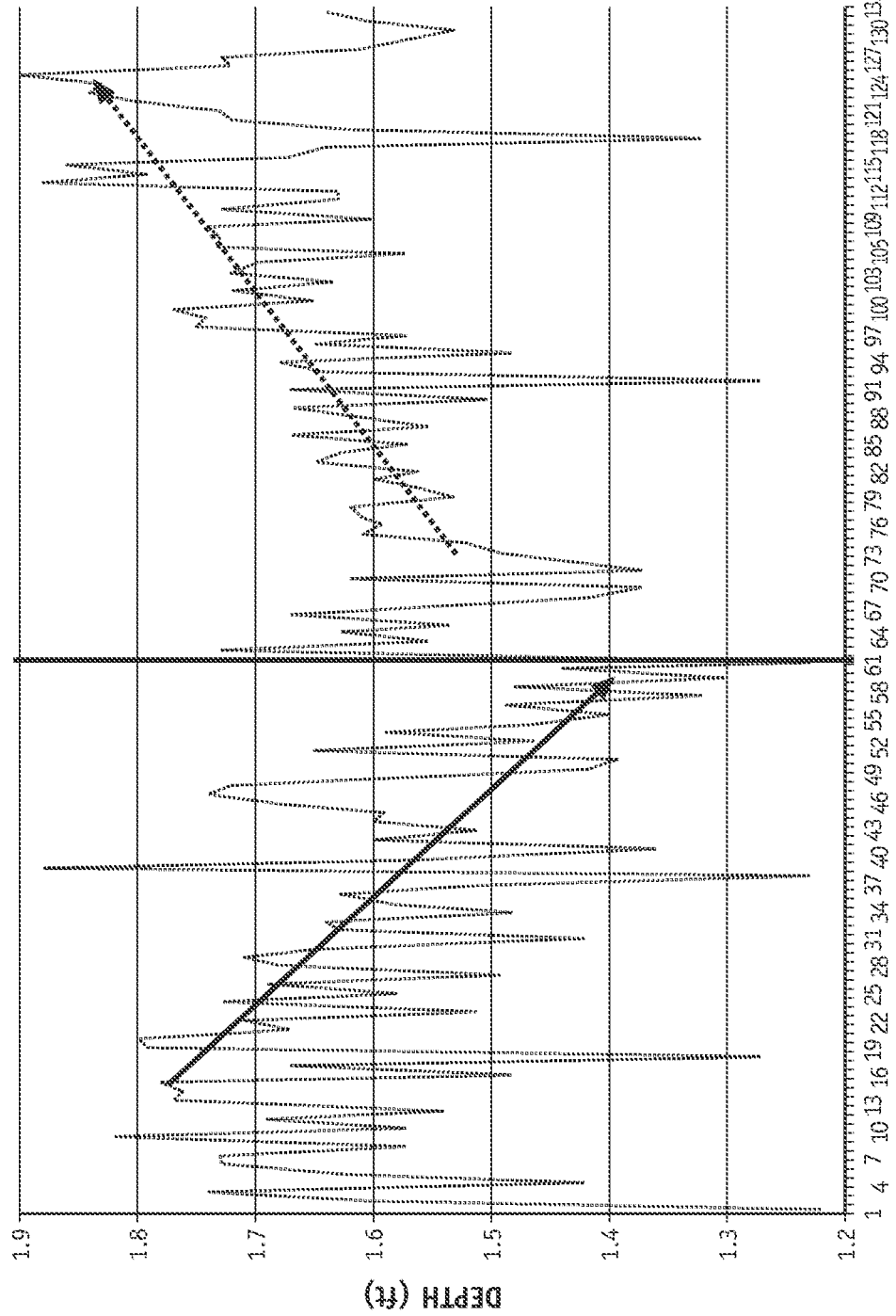
FIG. 10 is a graph of mechanical strength data collected from samples representing the same lateral well as described in FIG. 9, with the mechanical strength data indicating a trend supporting the identification of the same disruptive feature as identified by the rock volatile analysis presented in FIG. 9, such as a fault.
Figure 11:
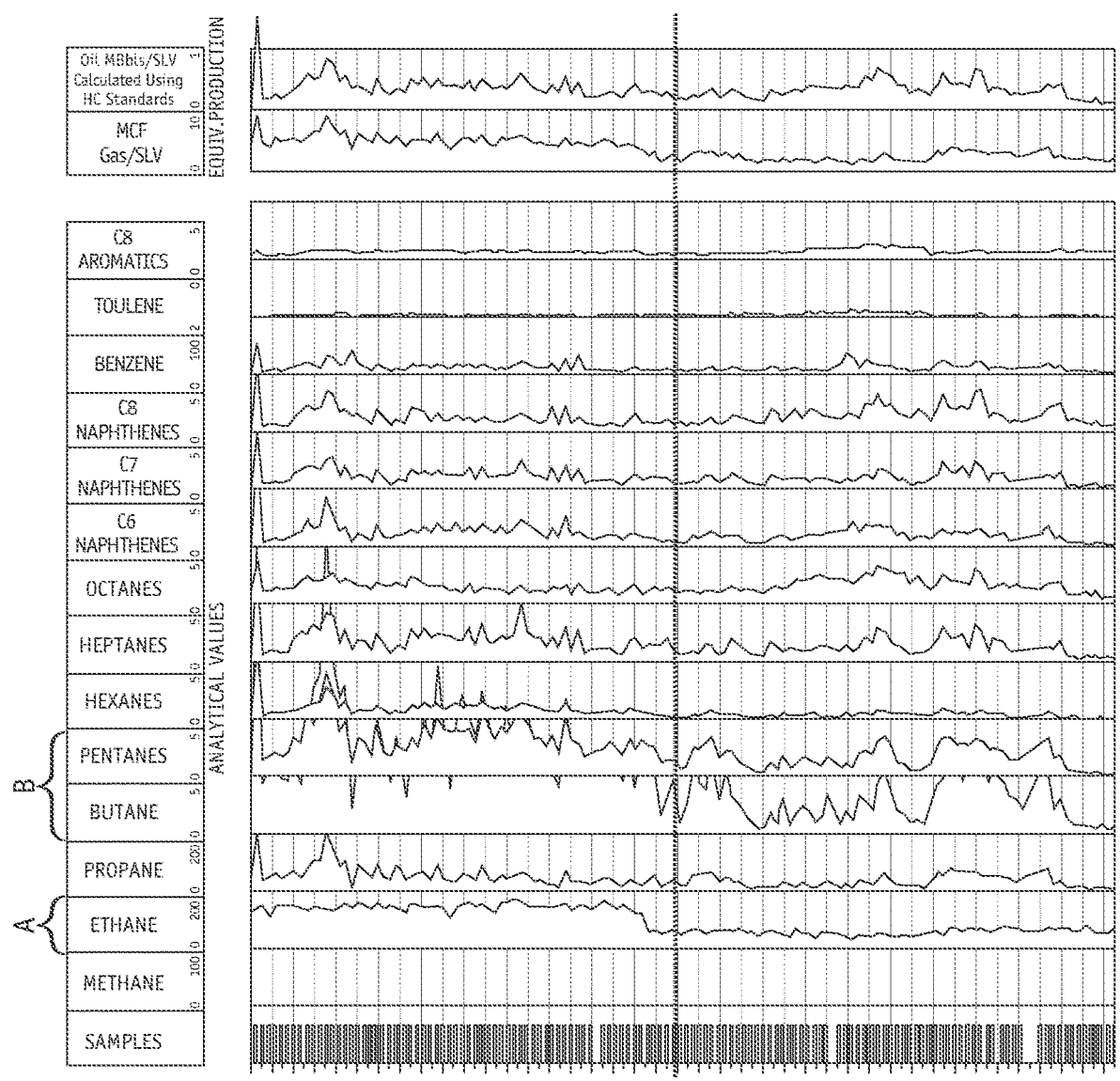
FIG. 11 is a second graph of rock volatiles data from the same samples analyzed and reported in FIG. 9, here providing individual analyte results, and further demonstrating the indication of the same disruptive feature as that identified by the analysis of FIGS. 9 and 10, e.g., the presence of a fault.

Cuttings samples were collected across the span of a chert lateral well within the STACK (Sooner Trend (oil field), Andarko (basin), Canadian and Kingfisher (counties)) play in Oklahoma, USA. Samples were washed and dried and bagged at the well. Rock lithology, rock volatiles analysis (using the methods described in the Smith patents, including gentle vacuum volatiles extraction, cryogenic capture of volatiles, warming release of trapped volatiles, and mass spectrometry quantitative analysis of the trap-released volatile compounds), and mechanical strength testing were performed on samples. Collected data are shown in FIGS. 9-12, with FIG. 9 providing of rock volatiles analysis data provided as grouped data; FIG. 10 providing mechanical strength data; FIG. 11 providing specific hydrocarbon data; and FIG. 12 providing rock volatiles analysis but specifically showing water analysis results.

Figure 12:
FIG. 12 is a third graph of rock volatiles from the same samples analyzed and reported in FIGS. 9 and 11, specifically highlighting the results of water analysis, and further supporting the indication of the same disruptive feature, e.g., a fault, as that identified by the analysis shown in FIGS. 9, 10, and 11.

In samples collected from this well, no obvious changes in rock lithology were observed. As shown in FIG. 9, a change in select rock volatiles analysis results is observed in the well at the location indicated at the location indicated by the dashed line in FIG. 9. At this location, the gas content (identified as A in FIG. 9), permeability (identified as B in FIG. 9), and organic acids (identified as C in FIG. 9) are observed to be different before and after this location of the well. Further, as shown in FIG. 11, levels of ethane (indicated as A in FIG. 11), and both butanes and pentanes (indicated as B in FIG. 11) are observed to be different before and after this same location in the well (the location again indicated as a dashed line in FIG. 11). Still further, as shown in FIG. 12, the water content, as shown in FIG. 12, is also observed to be different before and after this same location (the location again indicated in FIG. 12 as a dashed line, and the water content indicated as A). The combination of changes in gas content, permeability, organic acid content, ethane content, butanes content, pentanes content, and water content of samples all changing at the same location of the well indicate that a fault is likely present at that location.

This data is supported further by the analysis of mechanical strength results of samples across the same span of the well as shown in FIG. 10. FIG. 10 illustrates the mechanical strength data of samples wherein the mechanical strength drops as the samples collected approach the location of the fault (solid arrow). At the location of the suspected fault, the mechanical strength of samples reaches its lowest point. At this location, the mechanical strength of samples begins to increase as the samples move away from the suspected fault (dashed arrow).

Based on a small shift in gamma ray log data, geologists performing earlier work on the well had suspected the presence of a fault at the location identified in this Example. This was unknown to those performing this analysis at the time the analysis was conducted but was confirmed in the analysis described here. No fault was suspected based upon an analysis of rock lithology. However, application of rock volatiles analysis provides an indication of the presence of a fault crossing the well, and mechanical strength data appears to confirm this finding. The fault appears to be sub-seismic, having an approximately 5-foot throw. Faults of such a size cannot be detected using traditional geophysical techniques. This example demonstrates that changes in chemical composition and permeability as observed by rock volatiles analysis across a lateral well allow for the identification of a fault, and such data can provide insight into its role within the petroleum system. In aspects, the methods described here can be used in oil and gas exploration and production activities and the identification of sub-seismic faults and the elucidation of the behavior of fluids interacting with these faults also has implications for CCS/CCUS endeavors. Further, the technology can be applied to the prospecting of mineral deposits, evaluation of geothermal resources, and assessment of the risk of induced earthquakes caused by the injection of waste fluids into the subsurface. Increased permeability, and increased water content on the toe-side of the well (to the right of the dashed lines in FIGS. 9, 11, and 12) suggests that water, possibly carrying diagenetic compounds that enhance reservoir quality (e.g., acids) have moved along the fault and has entered the toe-side fault block. Mechanical strength data illustrating large-scale mechanical disruption, specifically showing a trend line with a distinct nadir (lowest point) at the location of the suspected fault, provide confirmatory (or at a minimum, supporting) evidence of such a fault presence. This Example illustrates the value of the application of such techniques to the identification of fault(s) in scenarios whereby change(s) in rock lithology is/are not appreciable within the same formation, and in scenarios whereby the fault is sub-seismic, wherein the identification of faults is applicable to the identification of suitable, or also or alternatively unsuitable, sites for carbon capture and sequestration.

List of Exemplary Aspects of the Invention

The following is a non-limiting list of exemplary aspects, which is intended to highlight various facets, features, or embodiments of the invention:

In aspects, the invention provides a method of assessing the carbon dioxide sequestration capability of a geologic site comprising (a) obtaining a plurality of geologic samples from the site sufficient for analyzing the rock volatiles carbon dioxide properties of at least a portion of the site, (b) measuring rock volatiles carbon dioxide level associated with the samples, and (c) determining if any areas of the site (zones) are associated with levels of rock volatiles carbon dioxide that are indicative of carbon sequestration capability based on the measured level of rock volatiles carbon dioxide level in the samples. ASPECT 1.

In aspects, the invention provides a method described in aspect 1, wherein step (c) does not comprise assessing levels of carbon monoxide, carbon monoxide-related compounds (e.g., formic acid), or directly assessing the levels of carbon dioxide-related compounds (e.g., carbonic acid or bicarbonate) (but can comprise assessing carbon dioxide that is formed from the disassociation of such compounds). ASPECT 2.

In aspects, the invention provides a method described in aspect 2, wherein the amount of rock volatiles carbon dioxide is the only rock volatiles measurement used in performing step (c). ASPECT 3.

In aspects, the invention provides a method described in aspect 1, wherein the method comprises comparing the results of performing steps (a)-(c) on samples obtained from at least two different drilling sites in or around the site. ASPECT 4.

In aspects, the invention provides a method described in aspect 4, wherein the method comprises validating that the rock composition of at least two of the at least two different sites are similar. ASPECT 5.

In aspects, the invention provides a method described in aspect 5, wherein the step of validating the similarity in rock composition of the at least two sites comprise evaluating the mechanical strength of geologically equivalent samples from both sites. ASPECT 6.

In aspects, the invention provides a method described in aspect 6, wherein the method comprises crushing each sample in a volatiles impervious crushable container and measuring the relative amount of crushing of the containers, wherein volatiles are extracted from the container for analysis of carbon dioxide. ASPECT 7.

In aspects, the invention provides a method described in aspect 7, wherein the crushing of the containers is measured after the extraction of the volatiles. ASPECT 8.

In aspects, the invention provides a method described in any one or more of aspects 1-8, wherein the method comprises directly measuring carbon dioxide in the volatiles. ASPECT 9.

In aspects, the invention provides a method described in any one or more of aspects 1-9, wherein the method comprises capturing the volatiles in a cryogenic trap and releasing the volatiles by heating. ASPECT 10.

In aspects, the invention provides a method described in aspect 10, wherein the method further comprises measuring carbon dioxide in the released volatiles by mass spectrometry. ASPECT 11.

In aspects, the invention provides a method described in any one or more of aspects 1-11, wherein the method comprises comparing the carbon dioxide levels between different parts of the site to identify parts of the site that are more or less suitable for carbon sequestration (making it possible to develop a map of suitable/unsuitable zones). ASPECT 12.

In aspects, the invention provides a method described in aspect 12, wherein the method comprises identifying areas associated with an at least about 10%, at least about 20%, at least about 25%, or at least about 33%, such as, e.g., a 10%-90%, e.g., 15%-95%, 15%-90%, 20-90%, or 20-80% increase or decrease in carbon dioxide in a region of at least about 300 feet, at least about 400 feet, at least about 500 feet, or more, in one or more directions as compared to a second region of the site of at least about 300 feet, at least about 400 feet, at least about 500 feet, or more, in one or more directions. ASPECT 13.

In aspects, the invention provides a method described in any one or more of aspects 1-13, wherein the method comprises factoring in real-world information about the site to the analysis. ASPECT 14.

In aspects, the invention provides a method described in any one or more of aspects 1-14, wherein the amount of carbon dioxide and carbon dioxide attributable to fluid inclusions is less than about 20%, less than about 10%, less than about 5%, less than about 2%, or less than about 1%. ASPECT 15.

In aspects, the invention provides a method described in any one or more of aspects 1-15, wherein the method is performed upon the occurrence or discovery of an event or condition, and the method is used to assess if an event or hazard has compromised the suitability of the site for use as a carbon capture and sequestration (CCS) site, carbon capture, utilization, and sequestration (CCUS) site, or both. ASPECT 16.

In aspects, the invention provides a method described in any one or more of aspects 1-16, wherein the method comprises assessing at least about 20 samples, at least about 40 samples, at least about 50 samples, or at least about 100 samples from the site. ASPECT 17.

In aspects, the invention provides a method described in any one or more of aspects 1-17, wherein the method comprises performing steps (a) and (b) of the method on a second set of samples obtained from the site or a related site significantly before or after the collection of the samples, and the method is used to assess changes in the ability of the site to sequester carbon dioxide over time. ASPECT 18.

In aspects, the invention provides a method described in aspect 18, wherein the method comprises comparing the amount of rock volatiles $CO_2$ measured in step (b) against a standard. ASPECT 19.

In aspects, the invention provides a method of assessing the potential carbon dioxide release impact of a proposed new drilling operation in a site, comprising performing steps (a) and (b) of the method described in aspect 1 on a site that is proximate and geologically related to a proposed site of a new drilling operation, to assess the potential loss of carbon dioxide from the site if the drilling was to be performed. ASPECT 20.

In aspects, the invention provides a method of assessing the carbon dioxide release associated with a subterranean activity (e.g., a drilling operation) comprising performing steps (a) and (b) of the method described in aspect 1 on samples obtained from the site of the subterranean activity and on samples from a proximate and geologically related site to assess the release of carbon dioxide associated with the subterranean activity. ASPECT 21.

In aspects, the invention provides a method described in aspect 21, wherein the subterranean activity is petroleum drilling. ASPECT 22.

In aspects, the invention provides a method of assessing changes in subterranean carbon dioxide over time in a site comprising (a) obtaining a sufficient number of geologic samples from the site at a first period; (b) measuring rock volatiles carbon dioxide level associated with the first period samples; (c) determining the carbon dioxide content of the site in the first period; (d) obtaining a sufficient number of geologic samples from the site at a second period; (e) measuring rock volatiles carbon dioxide level associated with the second period samples; (f) determining the carbon dioxide content of the site in the second period; and (g) comparing the difference in the carbon dioxide content in the site in the first and second periods to evaluate the change in carbon dioxide content of the site between the first period and second period. ASPECT 23.

In aspects, the invention provides a method of evaluating the degree of microbial degradation of oil in an oil deposit potentially exposed to microbial contamination comprising (a) identifying a site that is associated with a petroleum deposit where there is potential microbial contamination, (b) obtaining a sufficient number of geologic samples from the site during a first period and a second period, or, also or alternatively, obtaining a sufficient number of geological samples from the site and from a second site geologically related to, but located within 500 feet to 1 mile from the first site; (c) measuring rock volatiles carbon dioxide level associated with the first period and second period samples or associated with the site and the second geologically related site; and (d) determining the carbon dioxide content of the site to assess the degree of microbial degradation. ASPECT 24.

In aspects, the invention provides a method described in aspect 24, wherein the method comprises comparing the rock volatiles carbon dioxide measures from an area of potential microbial contamination to other areas of the site. ASPECT 25.

In aspects, the invention provides a method according to the description in any one or more of aspects 1-25, wherein the method further comprises evaluating the content of one or more additional rock volatiles that can be indicative of changes in the composition of a site or an area. ASPECTS 26.

In aspects, the invention provides a method described in aspect 26, wherein the one or more additional rock volatiles comprise volatiles associated with the presence of petroleum, such as carbon monoxide, carbon monoxide-related compounds (such as formic acid), or C1-C12 hydrocarbons. ASPECT 27.

In aspects, the invention provides a method described in aspect 27, wherein the one or more additional rock volatiles comprise volatiles that are gasses under typical atmospheric conditions, such as methane, helium, and combinations thereof. ASPECT 28.

In aspects, the invention provides a method of evaluating the carbon sequestration capacity of a site comprising (a) obtaining a plurality of geologic samples from the site sufficient for analyzing the rock volatiles carbon dioxide properties of at least a portion of the site, (b) measuring the level of one or more non-$CO_2$ and non-CO (carbon monoxide) rock volatiles in the samples that (i) are gasses under normal atmospheric conditions, (ii) have a molecular weight of about 100 Daltons or less, e.g., about 50 Daltons or less, or (iii) meet both criteria (i) and (ii), and (c) determining if the site or one or more zones thereof are associated with levels of such one or more volatiles are indicative of carbon sequestration capability or lack thereof. ASPECT 29.

In aspects, the invention provides a method described in aspect 29, wherein the one or more non-$CO_2$/non-CO rock volatiles comprise helium, methane, ethane, or propane. ASPECT 30.

In aspects, the invention provides a method for evaluating active changes in carbon dioxide content in a geologic formation comprising obtaining a number of rock samples associated with different parts of the site, measuring the amounts of carbon dioxide rock volatiles in the samples, and determining if there are two or more zones of significantly different levels of carbon dioxide content in the site. ASPECT 31.

In aspects, the invention provides a method described in aspect 31, wherein the formation contains a feature that is expected to be associated with carbon dioxide loss from part of the site or gain in part of the site, such as a part of the site that is associated with a fault, and the method comprises assessing differences between rock volatiles carbon dioxide levels in the area of the formation comprising the feature and areas of the formation separated from/distant to the feature (e.g., 50 ft or more, 100 ft or more, 250 ft. or more, 350 ft. or more, 500 ft. or more, 700 ft. or more, or 1000 ft or more away from the feature). ASPECT 32.

In aspects, the invention provides a method described in aspect 32, wherein the feature is identified by the application of gamma-ray analysis. ASPECT 33.

In aspects, the invention provides a method described in any one or both of aspect 32 and aspect 33, wherein the method comprises identifying one or more areas associated with anomalously high carbon dioxide rock volatiles and associating such areas with areas of carbon dioxide migration in, into, or out of the site. ASPECT 34.

In aspects, the invention provides a method described in any one or more of aspects 31-39, wherein the method further comprises determining the level of rock volatiles from the samples, wherein changes in at least methane content is (are) indicative of gas loss from parts of the formation. ASPECT 35.

In aspects, the invention provides a method described in aspect 34, wherein the only rock volatiles used to assess the suitability of the site for carbon sequestration are methane, carbon dioxide, or a combination thereof. ASPECT 36.

In aspects, the invention provides a method described in any one or more of aspects 31-36, wherein the site from which the samples are collected is a former oil and gas production site under evaluation for carbon sequestration. ASPECT 37.

In aspects, the invention provides a method described in any one or more of aspects 31-37, wherein the site from which the samples are collected is a site that has been demonstrated not to be leaky to buoyant fluids, such as natural gas or oil, but wherein the method identifies leakage of carbon dioxide from the site. ASPECT 38.

In aspects, the invention provides a method of evaluating a geological site for carbon sequestration comprising obtaining rock volatiles carbon dioxide level data that determines the level of past loss of carbon dioxide from the site; determining the level of ongoing carbon dioxide in the site; or both and evaluating the suitability of site based on such rock volatiles carbon dioxide data. ASPECT 39.

In aspects, the invention provides a method described in aspect 39, wherein the rock volatiles carbon dioxide data is combined with one or more other rock volatiles to evaluate whether a site could be, or whether a site continues to be, depending on the status of the site as a carbon sequestration site, a suitable site for carbon sequestration. ASPECT 40.

In aspects, the invention provides a method described in aspect 40, wherein the site is an actively used carbon sequestration site and the rock volatiles carbon dioxide data is combined with data obtained from monitoring the loss of one or more rock volatiles in the site, such as methane, to evaluate the condition of the carbon sequestration site. ASPECT 41.

In aspects, the invention provides a method of identifying the suitability of a site for carbon capture and sequestration (CCS), carbon capture, utilization, and sequestration (CCUS), or both, comprising identifying the leakage in the geological features of the site which may compromise the integrity of the site (e.g., making the site unsuitable, relatively less suitable, or relatively more risky for such applications), comprising (A) collecting a sufficient number of samples to be representative of the full span of the site; (B) analyzing (a) rock volatiles analysis including or excluding carbon dioxide rock volatile analysis, (b) rock permeability, (c) rock mechanical strength, or (d) any combination thereof; and (C) identifying change(s) in any one or more analytes at a particular location represented by the samples which is/are indicative of the presence of a geological feature affecting the expected integrity of the site and the predicted ability of the site to securely sequester carbon dioxide. ASPECT 42.

In aspects, the invention provides a method described in aspect 42, wherein two or more analytes or characteristics measured in step (B) both indicate the presence of a geological feature at the same location within the site. ASPECT 43.

In aspects, the invention provides a method described in aspect 43, wherein one of the characteristics measured in step (B) indicating the presence of a geological feature is mechanical strength of the rock. ASPECT 44.

In aspects, the invention provides a method of any of the preceding paragraphs of this section, wherein one or more steps of the method are performed in a computerized system comprising a computer readable media comprising instructions for carrying out one or more analyses corresponding to one or more method(s) or step(s) of such methods and for storing data relative to the analysis/analyses to be performed, processor(s) for executing such instructions, and one or more outputs, wherein the outputs comprise relaying analytical results, recommendations, or instructions for control of one or more devices involved in the analytical methods or related processes (e.g., processes relating to the monitoring of a CCUS/CCS site). In aspects, such an output could be an alarm system (e.g., for alerting personnel to carbon dioxide escape). In aspects, such methods comprise applying machine learning to data sets from the performance of such methods to develop a model and implement a machine learning model for performance of such methods. In aspects, such a machine learning model is performed under a supervised learning model or is developed through supervised machine learning. In aspects, such methods comprise automatic performance of one or more methods or step(s) of methods described in the preceding aspects under the control of a programmed/programmable computerized system. In aspects, computer implemented methods include generating a digital or other abstract representation of a site representing actual or potential carbon dioxide loss from the area (e.g., areas of potentially high or higher and low or lower risk). In aspects, such methods comprise comparison against standard(s). ASPECT 45.

In aspects, the invention provides a method described in one or both of aspect 10 and aspect 11, wherein the method comprises measuring the water content of geologic samples obtained from at least two sites at two different periods comprising subjecting the geologic samples of at least two sites to different vacuum extraction conditions, wherein the geologic samples were assessed to lack affinity for water which is a good indicator property of hydrophobicity of rock surface. ASPECT 46.

In aspects, the invention provides a method described in aspect 46, wherein the method can be used to determine whether, due to similar hydrophobicity pattern of rock of at least two sites, such rocks may be related to each other/share similar fluid history. ASPECT 47.

In aspects, the invention provides a method described in aspect 5, wherein the step of validating the similarity in rock composition of the at least two sites comprises evaluating the hydrophobicity of geologically equivalent samples from the ≥2 different sites. ASPECT 48.

In aspects, the invention provides a method described in any one or more of aspects 46-48, wherein method comprises measuring the rock volatile carbon dioxide of geologic samples obtained from at least two sites at two different periods comprising subjecting the geologic samples of at least two sites to different vacuum extraction conditions wherein carbon dioxide content is linked to reservoir pressure, further wherein the method comprises assessing carbon dioxide content of at least two sites over a period wherein no past evidence of carbon dioxide loss or migration was recorded suggesting the site is suitable for carbon capture, utilization sequestration (CCUS) applications, or both. ASPECT 49.

In aspects, the invention provides a method described in any one or more of aspects 1-49, wherein the method differs from previously described methods of evaluating carbon dioxide loss from faults, e.g., as described in WO 2020/051259, by, i.a., (1) the fact that the carbon dioxide evaluation is performed in a plurality of spatially separated sites that define most, generally all, or all of a carbon sequestration site/area, (2) that carbon dioxide loss evaluations are significantly more sensitive than in the evaluation of carbon dioxide loss from a fault-associated area, or (3) that the method further comprises either (a) not continuing to develop or using the site in view of the finding of a risk of carbon dioxide loss in the area or (b) applying changes to the site to significantly ameliorate, reduce, or stop the loss of carbon dioxide from the area/site. ASPECT 50.

The invention claimed is:

1. A method of evaluating the carbon sequestration capacity of a site comprising (a) obtaining a plurality of geologic samples from the site sufficient for analyzing the rock volatiles carbon dioxide properties of at least a portion of the site; (b) measuring one or more non-CO2 and non-CO (carbon monoxide) rock volatile in the samples that (i) are gases under normal atmospheric conditions, (ii) have a molecular weight of about 100 Daltons or less, or (iii) meet both criteria (i) and (ii) to determine the amount of one or more analytes associated with the samples; (c) measuring one or more characteristics based on mechanical strength, permeability, or both that are associated with the samples; (d) determining if the measured amounts of two or more analytes, two or more characteristics, or at least one analyte and at least one characteristic, indicate the presence of a geological feature; and (e) determining if the geological feature which is indicative of carbon sequestration capability, or lack thereof, of at least the portion of the site.

2. The method of claim 1, wherein the one or more non-CO2 or non-CO rock volatiles comprise helium, methane, ethane, propane, butanes, or pentanes.

3. The method of claim 1, wherein the method provides an assessment of whether faults are leaky and can be conduits for CO2 transportation or migration and leakage which makes at least a portion of the site unsuitable for use in (1) carbon capture and sequestration (CCS) applications, (2) carbon capture, utilization, and sequestration (CCUS) applications, or both (1) and (2).

4. The method of claim 1, wherein step (b) of the method does not comprise (i) measuring amounts of carbon monoxide, (ii) measuring amounts of formic acid or another carbon monoxide-related compounds, or measuring amounts of carbonic acid, bicarbonate, or other carbon dioxide-related compounds.

5. The method of claim 1, wherein the non-CO2 rock volatiles, the non-CO rock volatiles, the mechanical strength, the permeability, or any combination of any or all thereof are the only measurements made.

6. The method of claim 1, wherein the method further comprises performing steps (a) and (b) of the method on a second set of samples obtained from the site or a related site significantly before or after the collection of the geologic samples, and the method is used to assess changes in an ability of the site to sequester carbon dioxide over time.

7. The method of claim 1, wherein the method comprises obtaining geologic samples from at least two zones of the site and determining the relative risk of carbon dioxide loss from the at least two zones, and optionally generating a graphical, topographical, pictorial, or stratigraphic representation of the site that reflects the relative risk of carbon dioxide loss from the at least two zones.

8. The method of claim 1, wherein (i) the method comprises comparing the results of performing steps (a)-(c) on geologic samples obtained from at least two different wells or drilling areas in or around the site.

9. The method of claim 8, wherein the method comprises measuring the mechanical strength, the permeability, water content or any combination thereof of the geologic samples obtained from the at least two different wells or drilling areas.

10. The method of claim 9, wherein the method comprises measuring the mechanical strength of the geologic samples obtained from the at least two different wells or drilling areas.

11. The method of claim 9, wherein the method comprises measuring the water content of the geologic samples obtained from the at least two different wells or drilling areas at different periods of time.

12. The method of claim 11, wherein the geologic samples obtained from the at least two wells or drilling areas at two different periods of time comprise subjecting the geologic samples of the at least two wells or drilling areas to different vacuum extraction conditions.

13. The method of claim 11, wherein the method further comprises calculating a ratio of the water content of the geologic samples obtained from the at least two wells or drilling areas.

14. The method of claim 1, wherein the method further comprises measuring an amount of carbon dioxide in the geologic samples.

15. The method of claim 14, wherein the method comprises the measurement of the mechanical strength of the sample, measuring the mechanical strength comprising crushing each geologic sample in a rock volatiles impervious crushable container and measuring the relative amount of crushing of the containers, wherein (i) volatiles are extracted from each container for the measurement of carbon dioxide, (ii) the crushing of the containers is measured after the extraction of the volatiles, (iii) the method comprises directly measuring the carbon dioxide amount in the volatiles, (iv) the method comprises capturing the volatiles in a cryogenic trap and releasing the volatiles by controllably heating, and the method comprises measuring the carbon dioxide amount in the released volatiles by mass spectrometry.

16. The method of claim 14, wherein the amount of carbon dioxide attributable to fluid inclusions in the geologic samples is less than about 5% of the total amount of carbon dioxide in the geologic samples and the method comprises assessing at least about 20 samples.

17. The method of claim 14, wherein the measured amount of carbon dioxide from the geologic samples obtained from at least two sites at different periods of time suggests that there is no significant difference in the measured amount of carbon dioxide over the different periods of time at the at least two sites.

18. The method of claim 17, wherein the measurement of the amount of carbon dioxide from the geologic samples obtained from the different periods of time at the at least two sites reveals that there is no evidence of past CO2 migration or CO2 loss.

* * * * *